United States Patent
Sekiguchi

(10) Patent No.: US 6,814,546 B2
(45) Date of Patent: Nov. 9, 2004

(54) MULTIFAN-EQUIPPED APPARATUS FOR COOLING OBJECTS MOUNTED AT LOCAL INTERIOR REGIONS AND PROVIDED WITH FAN-UNIT ASSEMBLY AND OPERATION MONITORING MEANS HAVING AN ERROR DETECTOR

(75) Inventor: Takashi Sekiguchi, Kawasaki (JP)

(73) Assignee: Fujitsu Ltd., Kawasaki (JP)

( * ) Notice: Subject to any disclaimer, the term of this patent is extended or adjusted under 35 U.S.C. 154(b) by 0 days.

(21) Appl. No.: 10/112,474

(22) Filed: Mar. 28, 2002

(65) Prior Publication Data

US 2003/0053913 A1 Mar. 20, 2003

(30) Foreign Application Priority Data

Sep. 19, 2001 (JP) ........................................ 2001-285847

(51) Int. Cl.⁷ ................................................ F04B 41/06
(52) U.S. Cl. ............................... 417/3; 417/18; 417/32; 417/42; 417/426; 361/688; 361/695; 318/111
(58) Field of Search ................................ 417/3, 18, 22, 417/32, 42, 426, 63, 688; 361/688, 690, 695; 318/111, 112, 113

(56) References Cited

U.S. PATENT DOCUMENTS

| | | | | |
|---|---|---|---|---|
| 4,255,089 A | * | 3/1981 | Phillips et al. .................. | 417/2 |
| 4,686,434 A | * | 8/1987 | Kojima et al. ................. | 318/52 |
| 4,689,541 A | * | 8/1987 | Jones et al. .................. | 318/696 |
| 5,484,242 A | * | 1/1996 | Hiratsuka .................... | 165/247 |
| 5,712,541 A | * | 1/1998 | Larsson ....................... | 318/65 |
| 5,726,874 A | * | 3/1998 | Liang .......................... | 363/141 |
| 6,135,718 A | * | 10/2000 | Yang ........................... | 417/22 |
| 6,318,965 B1 | * | 11/2001 | Nair ............................. | 417/2 |
| 6,368,064 B1 | * | 4/2002 | Bendikas et al. ............... | 417/2 |
| 6,398,505 B1 | * | 6/2002 | Sekiguchi ...................... | 417/2 |
| 6,407,918 B1 | * | 6/2002 | Edmunds et al. ........... | 361/695 |
| 6,428,282 B1 | * | 8/2002 | Langley ........................ | 417/2 |
| 6,481,974 B2 | * | 11/2002 | Horng et al. ................ | 417/42 |
| 6,597,972 B2 | * | 7/2003 | Emberty et al. ........... | 700/304 |

FOREIGN PATENT DOCUMENTS

JP 2000346512 12/2000

* cited by examiner

*Primary Examiner*—Justine Yu
*Assistant Examiner*—Emmanuel Sayoc
(74) *Attorney, Agent, or Firm*—Katten Muchin Zavis Rosenman

(57) ABSTRACT

A multifan-equipped apparatus in which a plurality of objects mounted are controllably cooled by blowing air using a fan-unit assembly composed of a plurality of fan units. The plural fan units are divided into a plurality of groups; the fan units in the same group are arranged in a queue. And one of the fan units of each group is a master fan unit that is autonomically adjustable in revolutions per minute (rpm) in accordance with a current apparatus-environment temperature and serves to make a tuning control on the rpm of at least one of the remaining fan units in the same group so as to adjust the rpm to a first estimated value corresponding to the autonomic-adjusted rpm of the master fan unit. If an error has occurred in the state of operation of a fan unit of a group as the operation of every fan unit is monitored, the current rpm of the master fan unit of at least one necessary group is set to a second estimated value for a back-up control minimizing a possible loss of cooling performance of the fan-unit assembly due to the occurrence of the error.

46 Claims, 15 Drawing Sheets

FIG. 3
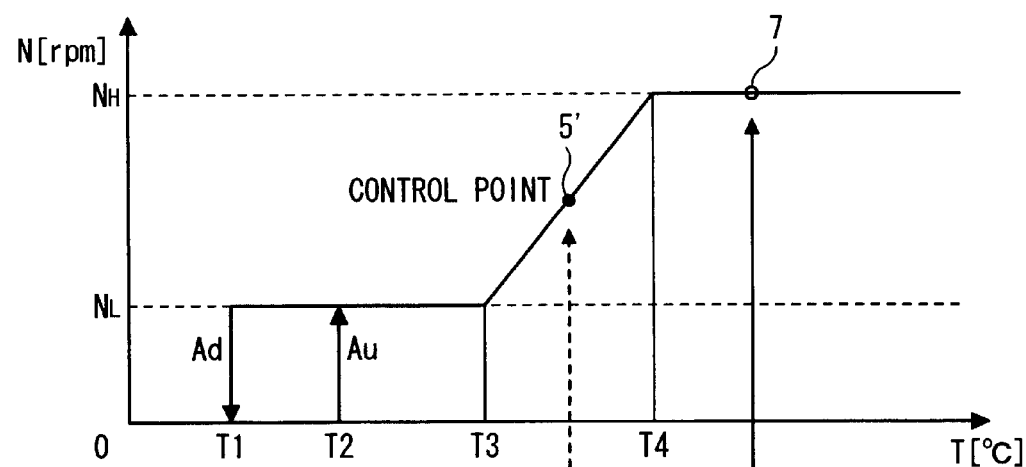
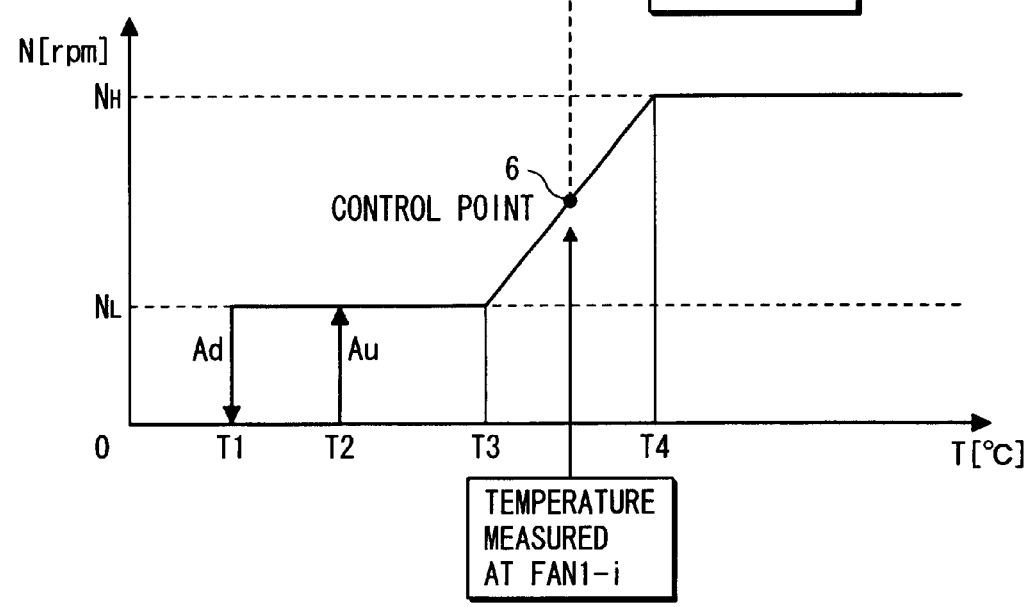

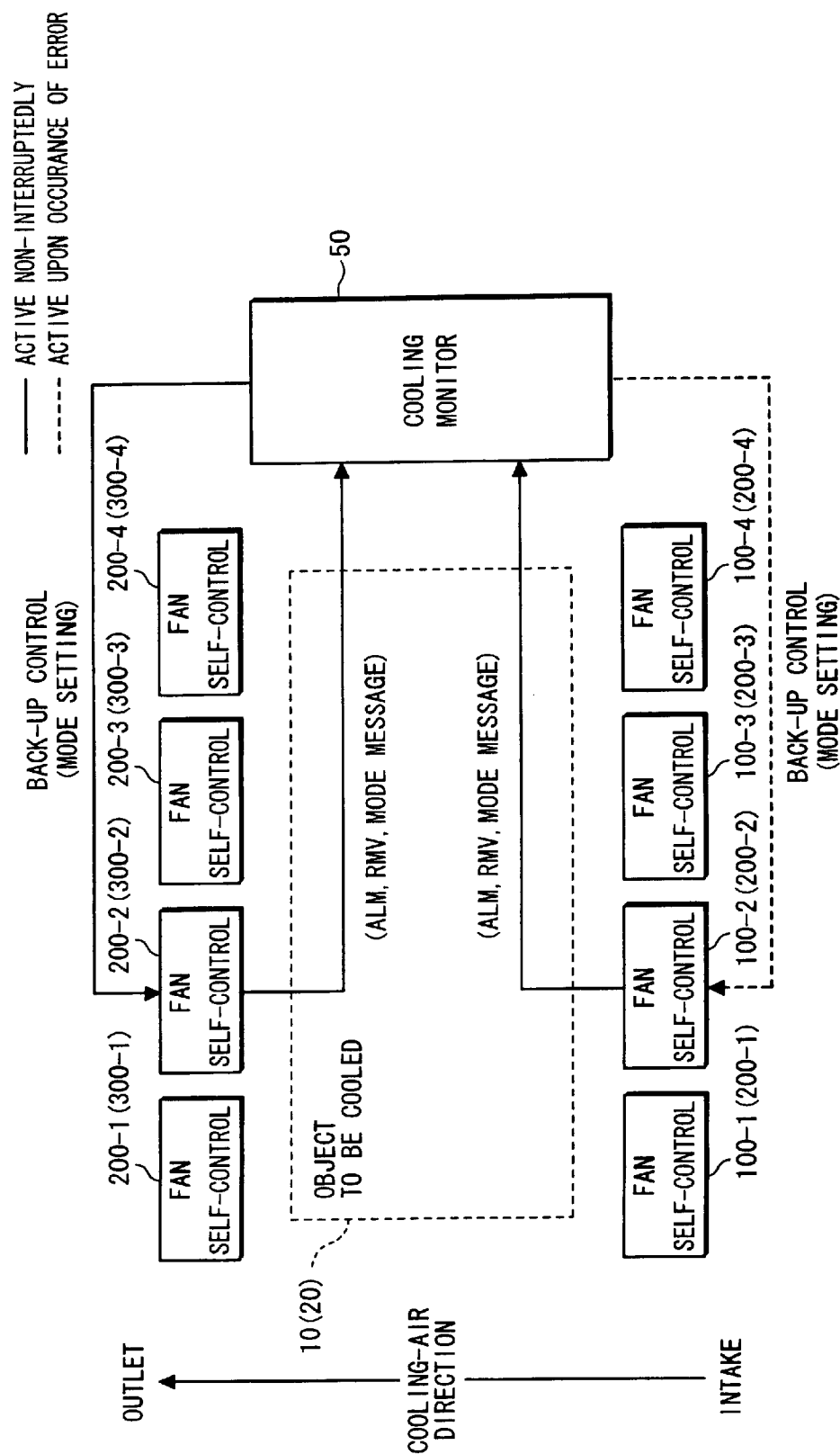

MULTIFAN-EQUIPPED APPARATUS FOR COOLING OBJECTS MOUNTED AT LOCAL INTERIOR REGIONS AND PROVIDED WITH FAN-UNIT ASSEMBLY AND OPERATION MONITORING MEANS HAVING AN ERROR DETECTOR

BACKGROUND OF THE INVENTION

1. Field of the Invention

The present invention relates to a multifan-equipped apparatus and a method of controlling operation of a fan-unit assembly of the apparatus. More particularly the invention concerns an improvement of the apparatus and method which are suitable for cooling a plurality of electronic devices by a plurality of fan units mounted in a plurality of layers one over another in a chassis of the apparatus.

2. Description of the Related Art

Nowadays electronics manufacturers have made attempts to develop less-powered electronic devices, which work at a low voltage, as demands for saving energy in electronics to assist environmental protection are on the rise. But, it is now harder time to cope with the heat problem of modern electronics (each hereinafter also called the apparatus) because, in the individual apparatus, a multiplicity of electronic devices are mounted in a chassis with high-density, thanks to recent advance of mounting technology. To this end, it is now a common practice to use a cooling fan (hereinafter also called the fan) as an easy and less-expensive measure. Accordingly demand for fan-equipped electronics will increase.

However, it is particularly essential to minimize consumption of power due to installation of the fan as many of electronics manufacturers are reluctant to increase the price of the apparatus only for use of the fan. In the meantime, it is important to secure an adequate degree of cooling performance of the fan.

For efficient operation of the fan, it is preferable to control the fan in rpm (revolutions per minute) in accordance with a current apparatus-environment temperature and a current operating condition of the apparatus. Many of electronic manufacturers incorporate a temperature sensor with the fan (the resulting fan is called the fan unit) so that the fan is autonomically adjusted in rpm, depending on a current temperature detected by the temperature sensor.

It is a common knowledge that the cooling performance (rpm) of every cooling fan unit will become worse as the fan ages. Consequently, for a multifan-equipped apparatus in which a plurality of fan units are mounted within the chassis, some of electronics manufacturers made, upon occurrence of an abnormality in cooling performance (undue lowering of cooling performance) with a certain fan unit, a back-up control on at least one fan unit about the abnormal fan unit, which are normally operating under autonomic control, to increase the current rpm in an attempt to keep necessary performance of the whole cooling system.

Thus according to the last-mentioned conventional technology, it was intended to realize a balance between economical operation of the fan-unit assembly and a cooling redundancy to cope with possible lowering of cooping performance, by adopting the autonomic/back-up control system. This prior art is exemplified by Japanese Patent Laid-Open Publication No. 2000-346512.

FIG. 13 of the accompanying drawings shows a conventional multifan-equipped apparatus in which a plurality of electronic units (electronics) to be cooled are mounted in a chassis 40, for example, in the form of a multiplayer rack. In FIG. 13, three electronic units 10, 20, 30 are supported one on each of three layers in the chassis 40. And three sets of fan units, each set including four fan units 100-1 through 100-4, 200-1 through 200-4, 300-1 through 300-4, are mounted one set under each of the electronic units 10, 20, 30.

In this multi-layer fashion of mounting, because the electronic unit 10 (20) is sandwiched between two set of fan units, cooling air for the electronic unit 20 (30) disposed leeward of the electronic unit 10 (20) would rise somehow due to the heat radiated by the last-named windward electronic unit 10 (20).

For this reason, during operation of the fan units 100-$i$, 200-$i$, 300-$i$ ($i$=a natural number selected from 1 through 4) under the above-mentioned autonomic control, the fan operation (rpm) would tend to be staggered between the individual fan units 100-$i$, 200-$i$, 300-$i$ would fluctuate due to the difference in temperature between the upper and lower layers within the chassis 40 and the difference in amount of radiated heat of the leeward and windward electronic units 10, 20, 30 so that cooling air flows within the chassis 40 would be out of balance, thus impairing the cooling efficiency and increasing noises.

In other words, the temperature detected at and about the leeward fan unit 200-$i$ (300-$i$) than that detected at and about the windward fan unit 100-$i$ (200-$i$) so that the rpm value fluctuates between the upper and lower fan units as each fan unit is operating under autonomic control in accordance with the respective temperature detected, which would result in an inefficient cooling operation.

To avoid this staggering of rpm between the lower set of fan units 100-$i$ (200-$i$) and the upper set of fan units 200-$i$ (300-$i$), as shown in FIG. 14, all the fan units are individually monitored by a common cooling monitor 50. And the cooling monitor 50 serves also to adjust the rpm of an individual upper fan unit 200-$i$ (300-$i$) to an individual lower fan unit 100-$i$ (200-$i$), which is disposed windward of the last-named upper fan unit, so as to keep cooling air flows within the chassis 40 in balance (back-up control).

In this monitoring, the cooling monitor 50 non-interruptedly monitors the current operation statuses (occurrence of an error, mounting/dismounting, current operation mode (autonomic control or back-up control), etc.) of the fan units individually; the individual fan unit 100-$i$, 200-$i$, 300-$i$ normally notifies the cooling monitor 50 of the current operation status of itself by a warning (ALM) signal, a dismounting (RMV) signal, a mode (MODE) signal, etc. Now assuming that an abnormality has occurred with a certain fan unit 100-$i$, 200-$i$, 300-$i$ or a certain fan unit 100-$i$, 200-$i$, 300-$i$ have been dismounted, the cooling monitor 50 makes a back-up control on a nearby fan unit 100-$j$, 200-$j$, 300-$j$ ($j$=a natural number selected from 1 through 4, $j \neq i$) by, for example, increasing the rpm of the last-named nearby fan unit to thereby keep the cooling performance of the whole fan-unit assembly.

In FIG. 14, arrow-headed lines are depicted with respect to the fan units 100-2, 200-2 (200-2, 200-3); the arrow-headed lines each indicates the direction in which a warning message is given from an individual fan unit 100-2 or 200-2 (200-2 or 200-3) to the cooling monitor 50 or the direction in which a back-up-control signal is given from the cooling monitor 50 to a nearby fan unit 200-1 or 100-2 (200-3 or 200-2). Also the solid arrow-headed line indicates that the warning message is given non-interruptedly, and the dotted arrow-headed line indicates that the back-up-control signal is given only upon occurrence of an error. (Similar lines with respect to the other fan units 100-1 (200-1), 200-1 (300-1), 100-3 (200-3), 200-3 (300-3), 100-4 (200-4), 200-4 (300-4) are omitted here for clarity of illustration.

For economical operation of the fan-unit assembly, the operation of the fan-unit assembly should be controlled preferably in accordance with the current apparatus-environment temperature as demand arises, and ideally linearly with the rise of the temperature. Practically, however, particularly under a sophisticated control environment in which cooling-air flows within the chassis 40 have to be kept in balance (back-up control), the conventional apparatus have no choice to adopt a non-linear and hence stepwise control, in which the rpm of the individual fan unit has to be changed stepwise to a selected one of a plurality of fixed values.

In this stepwise control, as shown in FIG. 15(B), a threshold value for the rpm of the individual fan should be incorporated with a hysteresis 70 to suppress possible flattering of the rpm due to the variations of in-apparatus temperature when the control mode is switched over. At that time, the hysteresis 70 has to be set for the rpm in accordance with around-fan-unit temperature; in such hysteresis 70, however, a sharp-rise-and-fall (in in-apparatus temperature) phenomenon as indicated by reference number 60, would inevitably occur due to the stepwise control, particularly when the rpm of the fan is changed from a low speed to a high speed and vice versa, as shown in FIG. 15(A).

Specifically, now assuming that the in-apparatus temperature rises with the increase of around-fan-unit temperature as the individual fan 100-$i$, 200-$i$, 300-$i$ is driven at the low-speed (NL), the driven speed of the fan 100-$i$, 200-$i$, 300-$i$ will be changed to the high speed (NH) when the current rpm reaches a predetermined threshold in-apparatus temperature, so that the in-apparatus temperature would rise and fall sharply as indicated by reference numeral 60 in FIG. 15(A). Because this phenomenon gives a temperature shock on the electronic units (or equipment) 10, 20, 30 to be cooled, the "stepwise control" is not the most practical control for the fan units 100-$i$, 200-$i$, 300-$i$.

On the other hand, in the linear-type control in which the rpm of the individual fan unit is controlled to vary linearly, it realizes a very efficient cooling operation. However, partly since the fan units 100-$i$, 200-$i$, 300-$i$ as individually self-controlled encounter a fluttering phenomenon for their different positions of amounting, and partly since such fluttering makes cooling-air flows within the chassis out of balance, it was very difficult to realize a harmonized combination of the conventional autonomic control and the conventional back-up control.

Moreover, in an alternative multi-layer arrangement in which an increased number of fan units are mounted in an effort to improve the cooling performance, the load of control to be executed by the cooling monitor 50 would increase basically in proportion to the total number of the fan units so that it would be very hard to fulfill such duty control, depending on the form of mounting of the whole fan-unit assembly.

SUMMARY OF THE INVENTION

With the foregoing problems in view, it is a first object of the present invention to provide a multifan-equipped apparatus in which a fan-unit assembly can be efficiently controlled in agreement with both the current status of operation of the apparatus and the environment of the apparatus to reduce the total consumption of electronic power to a minimum, thus guaranteeing a less-expensive cooling operation without risk of damaging objects to be cooled.

A second object of the invention is to provide a method for controlling the cooling operation of the fan-unit assembly of the multifan-equipped apparatus less expensively with a minimum risk of damaging objects to be cooled.

According to one generic feature of the invention, the first object is accomplished by a multifan-equipped apparatus in which a plurality of objects mounted at different local interior regions are controllably cooled by blowing air, comprising: a fan-unit assembly, composed of a plurality of fan units that are divided into a plurality of groups disposed at the respective local interior regions, for blowing air over the objects to cool, the plural fan units in the same group being arranged in a queue along the corresponding local interior region or across the different interior regions; one of the plural fan units of each group being a master fan unit that is autonomically adjustable in revolutions per minute (rpm) in accordance with a current apparatus-environment temperature at the corresponding local interior region and serves to make a tuning control on the rpm of at least one of the remaining fan units in the same group so as to adjust the last-named rpm to a first estimated value corresponding to the autonomic-adjusted rpm of the master fan unit; and means for monitoring every fan unit of each group in state of operation and, if an error occurs in the state of operation of a fan unit of a group, setting the current rpm of the master fan unit of at least one necessary group to a second estimated value for a back-up control minimizing a possible loss of cooling performance of the fan-unit assembly due to the occurrence of the error.

As a specific feature, the master fan unit of each group may include:

(1) a temperature sensor for detecting the temperature;

(2) an autonomic controller for autonomically controlling the rpm of the last-named fan unit based on a predetermined rpm-control reference signal; and (3) a first control-signal selector for selectively outputting a first control signal responsive to the temperature detected by the temperature sensor as the rpm-control reference signal to the autonomic controller and also as a tuning-control signal to the at least one remaining fan unit for the tuning control, and a second control signal, which is received from the monitoring means for the back-up control as the rpm-control reference signal to the autonomic controller and also as a tuning-control signal to the at least one remaining fan unit.

As another specific feature, every fan unit except the master fan unit in each group may include:

(1) a temperature sensor for detecting the temperature;

(2) an autonomic controller for autonomically controlling the rpm of the last-named fan unit based on a predetermined rpm-control reference signal; and (3) a second control-signal selector for selectively outputting a first control signal responsive to the temperature detected by the temperature sensor as the rpm-control reference signal to the autonomic controller and also as a tuning-control signal to the at least one remaining fan unit for the tuning control, and a second control signal, which is received from the master fan unit or the monitoring means for the back-up control as the rpm-control reference signal to the autonomic controller and also as a tuning-control signal to the at least one remaining fan unit.

According to another generic feature of the invention, the first object is accomplished by a multifan-equipped apparatus in which a plurality of objects mounted at different local interior regions are controllably cooled by blowing air, comprising: a fan-unit assembly, composed of a plurality of fan units that are divided into a plurality of groups disposed across the different local interior regions, for blowing air over the object elements to cool, the plural fan units in the same group being arranged in a queue along a common air flow; one of the plural fan units of each group being a master fan unit that is autonomically adjustable in revolutions per minute (rpm) in accordance with an apparatus-environment temperature in the corresponding local interior region and serves to make a tuning control on the rpm of at least one of the remaining fan units in each said group so as to adjust the last-named rpm to a first estimated value corresponding to the autonomic-adjusted rpm of said master fan unit; and means for monitoring every fan unit of each group in state of operation and, if an error occurs in the state of operation of a fan unit of a group, setting the current rpm of said master fan unit of at least one necessary group to a second estimated value for a back-up control minimizing a possible loss of cooling performance of said fan-unit assembly due to the occurrence of the error.

According to still another generic feature of the invention, the first object is accomplished by a multifan-equipped apparatus in which a plurality of objects mounted at different local interior regions are controllably cooled by blowing air, comprising: a fan-unit assembly, composed of a plurality of fan units that are divided into a plurality of groups disposed along the respective local interior regions or across the different local interior regions, for blowing air over the objects to cool, the plural fan units in the same units being arrange in a queue and common indirection of blowing air; and means for monitoring every fan unit of each group in state of operation and, if an error occurs in the state of operation of a fan unit of a group, varying revolutions per minute (rpm) of the fan units of at least one necessary group in accordance with a current apparatus-environment temperature in the corresponding local interior region using common control information to an estimated value for necessary coordinated control minimizing a possible loss of cooling performance of the fan-unit assembly due to the occurrence of the error, thereby controlling the rpm of the fan units of the fan-unit assembly in terms of groups using the common control information for the same group.

According to a further generic feature of the invention, the second object is accomplished by a method of controlling operation of a fan-unit assembly of a multifan-equipped apparatus in which a plurality of objects mounted at different local interior regions are cooled by blowing air, comprising the steps of:

(a) dividing a plurality of fan units of the fan-unit assembly into a plurality of groups that are disposed along the respective local interior regions or across the different local interior regions for blowing air over the objects, the plural fan units of each group being arranged in a queue, one of the plural fan units of each group being a master fan unit;

at the master fan unit (b) making an autonomic control on itself in revolutions per minute (rpm) in accordance with a current apparatus-environment temperature at the corresponding local interior region, and then making a tuning control on the rpm of at least one of the remaining fan units of the same group so as to adjust the last-named rpm to a first estimated value corresponding to the autonomic-adjusted rpm of the master fan unit;

(c) monitoring every fan unit of each group in state of operation; and if an error occurs in the state of operation of a fan unit of a group (d) setting the current rpm of the master fan unit of at least one necessary group to a second estimated value for a back-up control minimizing a possible loss of cooling performance of the fan-unit assembly due to the occurrence of the error.

According to another generic feature of the invention, the second object accomplished by a method of controlling operation of a fan-unit assembly of a multifan-equipped apparatus in which a plurality of objects mounted at different local interior regions are cooled by blowing air, comprising the steps of:

(a) dividing a plurality of fan units of the fan-unit assembly into a plurality of groups that are disposed along the respective local interior regions or across the different local interior regions for blowing air over the objects, the plural fan units of the same group being arranged in a queue along a common path of air flow, one of the plural fan units of each group as a master fan unit;

at the master fan unit (b) making an autonomic control on itself in revolutions per minute rpm in accordance with a current apparatus-environment temperature at the corresponding local interior region, and then making a tuning control on the rpm of every remaining fan unit in the same group so as to adjust the last-named rpm to a first estimated value corresponding to the autonomic-adjusted rpm of the master fan unit; and (c) monitoring every fan unit of each group in state of operation; and if an error occurs in the state of operation of a fan unit of a group (d) setting the current rpm of the master fan unit of at least one necessary group to an estimated value for a back-up control minimizing a possible loss of cooling performance of the fan-unit assembly due to the occurrence of the error.

According to an additional generic feature of the invention, the second object is accomplished by a method of controlling operation of a fan-unit assembly of a multifan-equipped apparatus in which a plurality of objects mounted at different local interior regions are cooled by blowing air, comprising the steps of:

(a) dividing a plurality of fan units of the fan-unit assembly into a plurality of groups that are disposed along the respective local interior regions or across the different local interior regions, for blowing air over the object element to cool, the plural fan units of the same group being common in direction of blowing air;

(b) monitoring every fan unit of each group in state of operation; and if an error occurs in the state of operation of a fan unit of a group (c) varying revolutions per minute (rpm) of the fan units of at least one necessary group in accordance with a current apparatus-environment temperature in the corresponding local interior region using common control information to an estimated value for necessary coordinated control minimizing a possible loss of cooling performance of the fan-unit assembly due to the occurrence of the error, thereby controlling the operations of the fan units of the fan-unit assembly in terms of groups using the common control information for the same group.

Following are advantageous results with the present invention:

(1) Partly because the master fan unit makes a tuning control on the rpm of at least one slave fan unit of the same group in accordance with the autonomic-adjusted self-fan rpm, and partly because the rpm of the master fan unit of a necessary group is set by a back-up control as demand arises, the tuning control and back-up control can be carried out in terms of groups. It is therefore possible not only to improve the cooling efficiency to a great extent with keeping cooling-air flows normally in balance but also to cope with cooling control by the fan-unit assembly, whichever they are arranged in a two-dimensional fashion or a three-dimensional fashion, thus facilitating the duty control (reducing the load of control) of the monitor/controller unit. As a result, a multifan-equipped apparatus having adequate cooling performance can be realized with reduced power consumption.

(2) Because the monitor/controller unit monitors every fan unit by periodically polling whether an error occurs with any fan unit in status of operation and, if an error has steadily occurred with the same fan unit for a predetermined time, then judges that such fan unit is in trouble, it is possible to realize an error detection with improved accuracy.

(3) Partly because the individual fan unit has not only a function of outputting a signal responsive to the temperature detected by itself as a self-fan rpm-control reference signal and a tuning-control signal to another fan unit of the same group, but also a function of outputting, upon receipt of a tuning-control signal from outside (the monitor/controller unit or another fan unit, the received control signal as a substitution for a self-fan rpm-control reference signal and a tuning-control signal to such another fan unit, respectively, tuning control can be realized in terms of groups. Further, transmission of a tuning-control signal can be performed independently of the controlling of the fan rpm and hence can be attained correctly irrespective of a possible occurrence of an error with the self-fan rpm.

(4) Because the individual fan unit is autonomically controlled (in rpm) linearly, it is possible to prevent any occurrence of sharp-rise-and-fall temperature, which would have encountered with the stepwise control in the prior art, so that any bad influence on the objects to be cooled can be effectively suppressed, guaranteeing a damage-less cooling operation.

(5) By comparing the voltage corresponding to the self-fan rpm with the output voltage of an rpm-control signal and feedback-controlling the self-fan rpm in such a manner that the voltage difference is minimal, it is possible to control the individual fan unit stably at a predetermined rpm even under an disturbance environment, such as fluctuation of supply voltage or variation of load torque of the fan due to the temperature change.

(6) Partly because the output voltage of the self-rpm detector, which is one of the two voltages to be compared in the feedback control, is filtered by the first filter circuit, and the voltage of an rpm-control reference signal, which is the other voltage to be compared in the feedback control, is filtered by the second filter circuit, and partly because a time constant present for the second filter circuit is larger than that preset for the first filter circuit, a response of the second filter circuit would delay behind that of the first filter circuit so that an undue oscillation in the feedback control can be avoided even when the rpm-control reference voltage fluctuates suddenly, thus realizing a stabilized rpm control.

(7) Because the linear-type autonomic control is attained by an analog circuit that includes the reference voltage circuit responsive to the self-fan rpm and the comparator/amplifier unit, which amplifies the voltage difference linearly, it is possible to reduce the price of the apparatus.

(8) Further, because the error detector also is attained by a simple analog circuit that includes the voltage converter for converting information about the self-fan rpm into a voltage value and the error detector for comparing the output voltage of the voltage converter with a threshold voltage value and discriminates, from the result of comparison, whether or not an error has occurred, it is advantageous to reduce the cost of production.

(9) By mounting the individual fan units on a substrate having a card-edge interface, which is electrically connectable to an external tester if fitted in the external tester, so that each fan unit receives a testing signal from the external tester, it is possible to have electric access to the individual fan unit from the external tester without increasing the number of pins of a mating connecter of the tester even when the individual fan unit to be tested is mounted not solely, facilitating the testing with minimum cost. Inserting (fitting) the card-edge interface of the substrate into the mating connector 14 of the external tester suffices to test, it is possible to carry out the testing operation with improved efficiency.

(10) By inputting, for example, a pseud rpm signal as the above-described testing signal from the external tester to the fan unit via the card-edge interface, it is possible to make an operation test of the error detector with ease.

(11) Given that one or more Ids respectively unique to one or more items to be tested are assigned to the card-edge interface, it is possible to automatically recognize from the external tester what is the object item, improving the efficiency of automated testing operation.

Other subjects and further features of the present invention will be apparent from the following detailed description when read in conjunction with the accompanying drawings.

BRIEF DESCRIPTION OF THE DRAWINGS

FIG. 3 is a graph illustrating a linear self-control according to the one embodiment;

FIG. 14 is a block diagram showing the key construction of a conventional cooling system.

DESCRIPTION OF THE PREFERRED EMBODIMENTS

Embodiments of the present invention will now be described with reference to the accompanying drawings.

Figure 1:
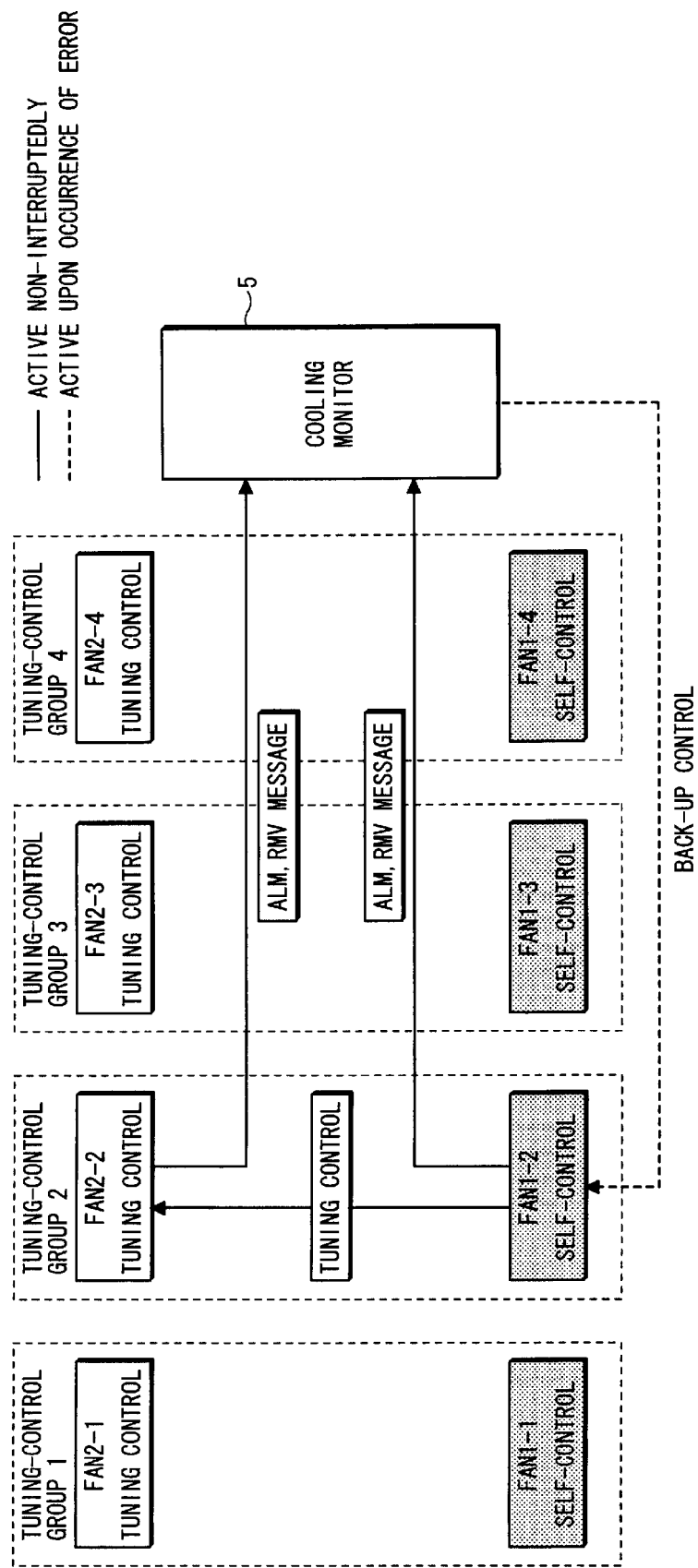
FIG. 1 is a block diagram showing a controlled-multifan cooling system (multi-fan apparatus) according to one embodiment of the present invention.

FIG. 1 is a block diagram showing a controlled-multifan cooling system (hereinafter also called the multifan-equipped apparatus) according to one embodiment of the present invention. The multifan-equipped apparatus of FIG. 1 comprises a fan-unit assembly composed of a plurality of fan units (each hereinafter also called the cooling fan or simply fan), which are divided into a plurality of (four in the illustrated example) groups FAN1-1 through -4, FAN2-1 through -4, FAN3-1 through -4, ... (FIG. 2), for blowing air for a purpose described below, and a cooling monitor (cooling monitor/controller) 5. The individual fan units FAN1-$i$, FAN2-$i$, FAN3-$i$ (i is a natural number selected from 1 through 4)) of four groups are mounted in, for example, a chassis 40 shown in FIG. 13 in three layers one over another.

Figure 2:
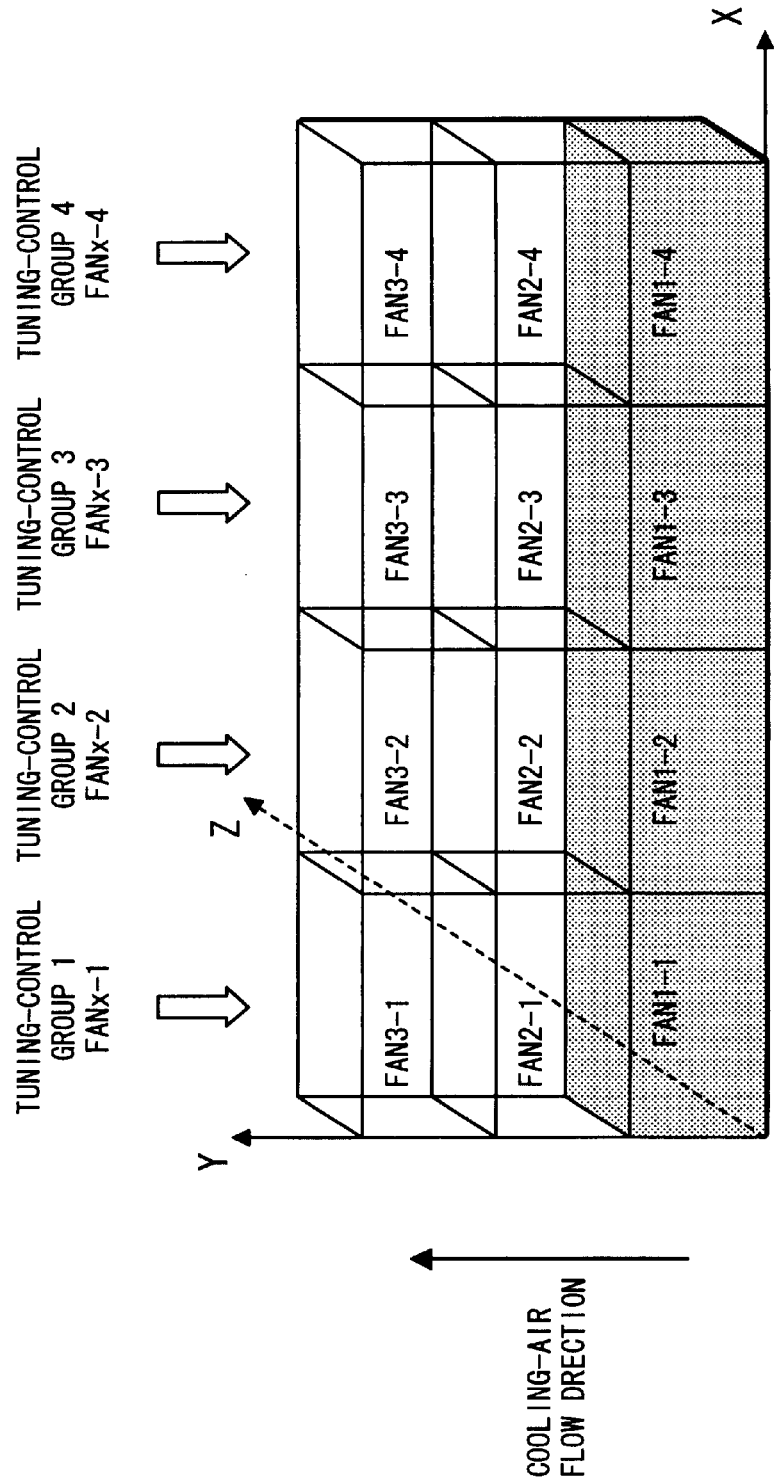
FIG. 2 is a diagram of an exemplified structure of the multifan-equipped apparatus of the one embodiment, only showing a plurality of fan units mounted in a non-illustrated chassis.
Figure 13:
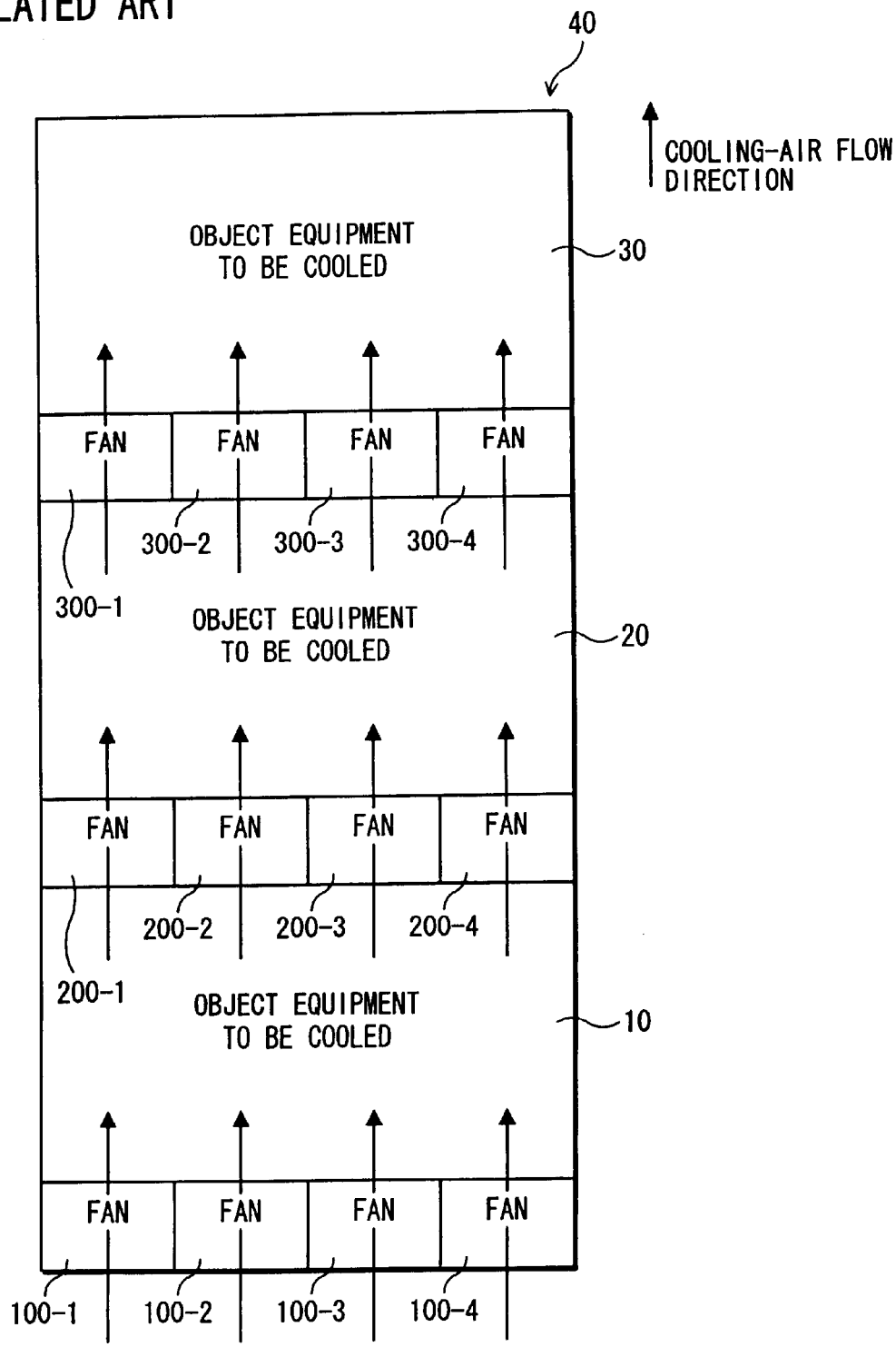
FIG. 13 is a schematic front view of the multifan-equipped apparatus, showing a plurality of electronic units mounted in a chassis as objects to be cooled.
Figures 15A, 15B:
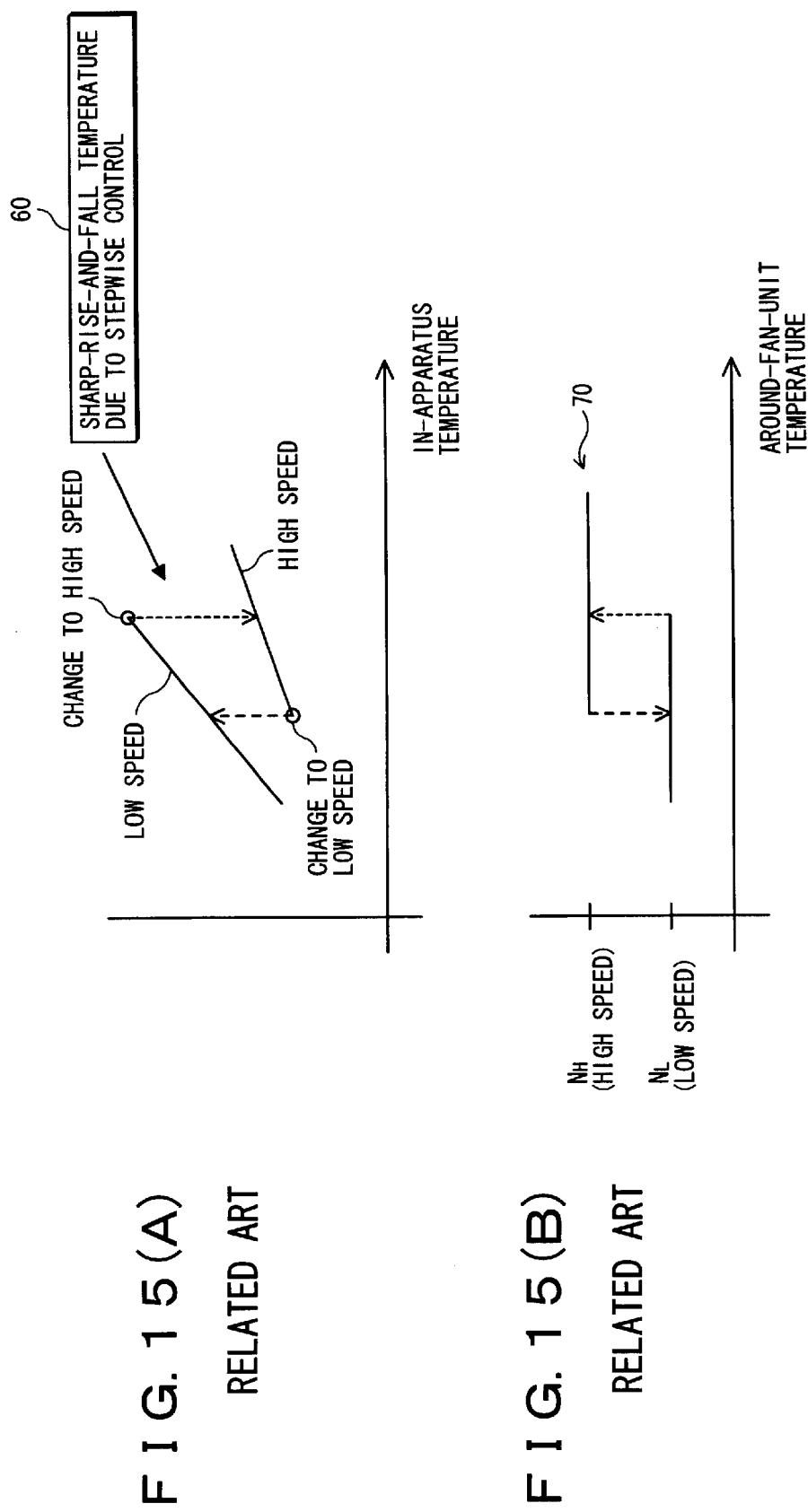
FIGS. 15(A) and 15(B) are characteristic graphs illustrating a problem with a conventional, stepwise self-control.

FIG. 2 is a diagram of an example in which the plural fan units FAN1-$i$, FAN2-$i$, FAN3-$i$ are thus mounted in a multi-layer fashion in the chassis 40 (FIG. 13). In FIG. 2, Y axis represents the vertical direction, i.e. the direction of height of the multifan-equipped apparatus, X axis represents the first horizontal direction, i.e. the direction of width of the apparatus, and Z axis represents the second horizontal direction, e.g. the direction of depth of the apparatus. Therefore, in the example of FIG. 2, four sets of the fan-units are arranged in a queue, one to the next, in the width direction (X axis), and, in each set, three fan-units are arranged in a queue, one over another, in the height direction (Y axis), only a single rows of fan units existing in the depth direction (Z axis). The number of the fan units mounted in the chassis 40 should by no means be limited to this illustrated example; alternatively, for example, more than one row of fan-units may be arranged along Z axis so that the efficient fan-control as described above can be realized.

Each fan unit FAN1-$i$, FAN2-$i$, FAN3-$i$ includes a cooling fan for blowing air over a plurality of electronics, which are disposed within the chassis 40 (FIG. 13) at different local regions (hereinafter called the local interior regions as object elements to be cooled, and also is equipped with a function of autonomically controlling the last-named fan in rotation speed or revolutions per minute (hereinafter called rpm) in accordance with an apparatus-environment temperature (hereinafter simply called temperature), which is an air temperature periodically measured or detected inside the chassis 40 as an in-apparatus temperature or an around-apparatus temperature. In this embodiment, for example, this autonomic control function of each fan is carried out using a linear self-control table shown in FIG. 3, as linear-type self-control. In FIG. 3, T1 through T4 each represent the degree of a current temperature (herein T1<T2<T3<T4) measured or detected at each of the four fan units for every group FAN1-$i$, FAN2-$i$, FAN3-$i$.

Each fan-unit FAN1-$i$, FAN2-$i$, FAN3-$i$ starts operating itself at NL in rpm (low-speed control operation) when the current temperature (detected temperature) rises over T2, and continues the operation until the temperature will drop lower than T1. If the current temperature is higher than T4, the rpm fan is autonomically adjusted to NH to run in high-speed control operation, which is faster than NL. If the current temperature is between T3 and T4, then the rpm of the fan is controlled linearly between NL and NH.

In the structure of FIG. 2, in which the fan units FAN1-$i$, FAN2-$i$, FAN3-$i$ are mounted one over another within the chassis 40, the temperature detected at the fan unit FAN2-$i$ (or FAN3-$i$) windward with respect to cooling air from the fan unit FAN1-$i$ (or FAN2-$i$) is higher than that detected at the fan unit FAN1-$i$ (or FAN2-$i$) leeward with respect to cooling air from the fan unit FAN2-$i$ (or FAN3-$i$). For this reason, the rpm values would stagger between the lower and upper fan units FAN1-$i$ and FAN2-$i$ (or FAN2-$i$ and FAN3-$i$) solely by the self-control operation using the respective detected temperatures, causing only an inefficient cooling operation of the entire fan-unit assembly.

As shown in FIG. 3, assuming that the individual fan unit FAN1-$i$, FAN2-$i$, FAN3-$i$ have thus autonomically controlled, for example, the detected temperature with the lower fan unit FAN1-$i$ (FAN2-$i$) is within a range of T3 through T4 (namely, during the low-speed control), while the detected temperature with the upper fan unit FAN2-$i$ (FAN3-$i$) is already higher than T4 (measured at a time point 7 in FIG. 3); this is, the upper fan unit FAN2-$i$ (FAN3-$i$) are under the high-speed control.

To avoid this phenomenon, in FIG. 3, the upper fan unit FAN2-$i$ (or FAN3-$i$) should be controlled, at the time (control point 5') when the current temperature is measured at the lower fan unit FAN1-$i$ (FAN2-$i$), in such a way that the rpm of the former is tuned to the rpm of the latter (tuning-control).

Consequently, in this embodiment, as shown in FIGS. 1 and 2, the plural fan units (e.g. the fan-units FAN1-$i$, FAN2-$i$, FAN3-$i$ that are arranged in a queue along a path of air flow, overlapping one another as seen from above) are divided into a plurality of groups, each group being typically defined as a tuning-control group i. Specifically, the fan units FAN1-1, FAN2-1, FAN3-1 belong to a first tuning-control group 1; the fan-units 1-2, 2-2, 3-2, to a tuning-control group 2; the fan-units 1-3, 2-3, 3-3, to a second tuning-control group 3; and the fan-units 1-4, 2-4, 3-4, to a third tuning-control group 4. And, in the same tuning-control group i, one of the plural fan units is designated as a master fan unit (hereinafter also called the tuning-control master or simply master) that is autonomically adjustable in rpm and serves to make a tuning control setting the rpm of one or more of the remaining fan units x–i (x=2 or 3) to a first estimated value corresponding to the autonomic-adjusted rpm of the master fan unit.

As the master fan unit, it is essential to choose a cooling fan that can perform both self-control and tuning-control in an errorless manner for efficient operation of the apparatus as compared to any other fan unit in the same tuning-control group. In the example of FIGS. 1 and 2, the fan unit FAN1-$i$ mounted in the chassis 40 (FIG. 13) at the bottom is designated as the tuning-control master.

In this embodiment, the tuning-control master FAN1-$i$ makes a tuning control (tuning adjustment) on at least one of the remaining fan unites (hereinafter also called the tuning-control slave or simply slave) FAN2-$i$, which belong to the same group i. For this tuning-control, the master FAN1-$i$ transmits a signal (tuning-control signal) to at least one remaining fan unit (slave) FAN2-$i$ for tuning the rpm of the last-named slave to the autonomic-adjusted rpm of the master FAN1-$i$. Upon receipt of the tuning-control signal from the tuning-control master FAN1-$i$, then the slave FAN2-$i$ serves likewise the master FAN1-$i$ to relay the received tuning-control signal to another remaining fan unit (tuning-control slave) FAN3-$i$.

As described above, each of the successive fan units FAN1-$i$, FAN2-$i$, FAN3-$i$, which belong to the same tuning-group i, receives the tuning-control signal relayed from the preceding fan unit and then relays the same tuning-control signal to the succeeding fan unit. Namely, the individual fan units FAN1-$i$, FAN2-$i$, FAN3-$i$ are controlled in rpm to make tuning control upon receipt of the same tuning-control signal in accordance with an around-fan-unit temperature. Accordingly, the remaining fan units FANx-$i$, in the same tuning-control group are controlled in rpm likewise the master fan unit; this is, the remaining fan units are adjusted in rpm under the tuning-control of the master fan unit. As a result, all the fan units FAN1-$i$, FAN2-$i$, FAN3-$i$ of the same group are controlled as a single set.

With the combination of the self-control, the tuning control, and the back-up control, this multi-fan cooling system realizes adequate cooling performance in terms of fan-unit groups with less operating power.

Alternatively, for the tuning control, the master fan unit may directly control each and every individual remaining fan unit (slave) FANx-$i$ without, relaying the control signal. For connection between the fan units FAN1-$i$, 2-$i$, 3-$i$, it is preferred to use cables because they are practically convenient as compared to wireless connection, which is more expensive for present.

As another function, the individual fan unit FAN1-$i$, 2-$i$, 3-$i$ monitors rpm of itself and outputs an alarm or a warning signal to the cooling monitor 5 when the rpm is found erroneous as it is slower than a predetermined threshold value. The cooling monitor 5 serves to make the back-up control (varying the current rpm value) to necessary fan units, which are operating errorlessly, upon receipt of the warning signal, thus minimizing a possible loss of cooling performance of the apparatus.

Given that the individual slave fan units of the same group are thus adjusted in rpm by the tuning control, controlling only the tuning-control master FAN1-$i$, a decision-maker of the tuning-control group i, by the cooling monitor 5 suffices. This is true because all the slave fan units in the same group are controlled by one and same control signal, which results in a remarkably reduced duty load of control by the cooling monitor 5.

Not only for connection dedicated to transmission of the warning signal between the cooling monitor 5 and the individual fan units FAN1-$i$, 2-$i$, 3-$i$, but also for connection dedicated to transmission of the back-up-control signal from the cooling monitor 5 to the master fan unit FAN1-$i$, it is preferable to use cables.

Figure 4:
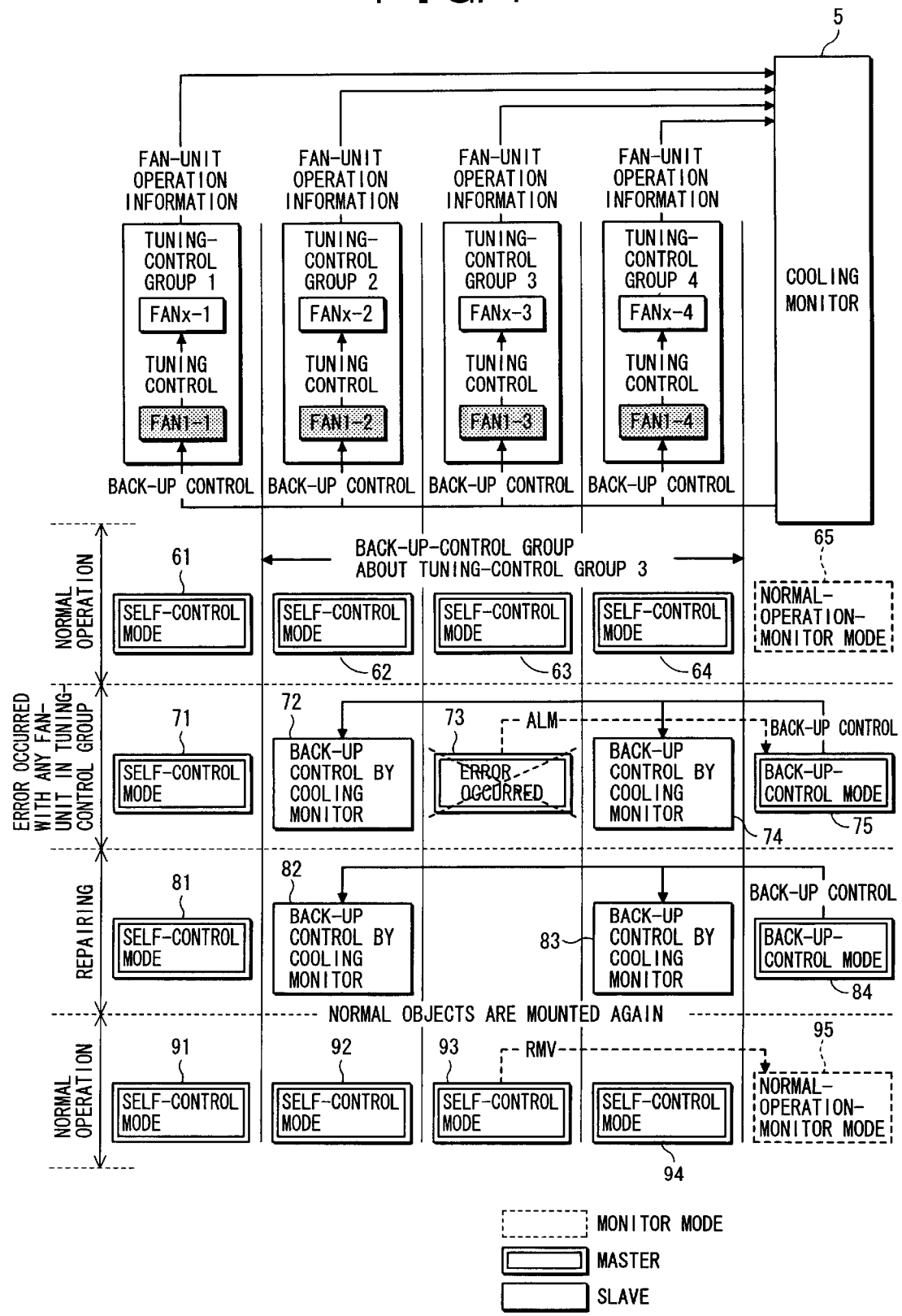
FIG. 4 generally illustrates a back-up control by a cooling monitor of the multifan-equipped apparatus according to the one embodiment.

The back-up control by the cooling monitor 5 will now be described generally with reference to FIG. 4.

While all the fan units FANx-$i$ are operating errorlessly, the cooling monitor 5 assumes an normal-operaton-monitor mode (indicated by reference number 65) in which the operations of the individual fan units FAN1-$i$, FAN2-$i$, FAN3-$i$ are monitored. At that time, the master fan unit FAN1-$i$ assumes a self-control mode (indicated by reference numbers 61–64) in which the remaining fan units (slave) FANx-$i$, exclusive of FAN1-$i$, of the same tuning-control group i are adjusted in rpm based on the self-control of the master fan unit.

Now assuming that an error occurs with one of the fan unit FANx-$i$ (for example, fan unit FANx-3 as indicated by reference number 73) and the error is notified to the cooling monitor 5 by a warning signal, the cooling monitor 5 makes a back-up control (indicated by reference number 75) on only the master fan unit FAN1-$i$ of at least one tuning-control group j (j=1 through 4, j≠i) that requires such back-up control to minimize a possible loss of under-normal-condition cooling performance due to the error.

If the necessary tuning-control groups requiring the back-up control are tuning-control groups 2–4 adjacent to the tuning-control group 3 with which the error has occurred, then the cooling monitor 5 outputs a back-up control signal to the respective master fan units FAN1-2, FAN1-4 of the tuning-control group 2 and 4.

In each of the necessary tuning-control groups 2 and 4, the back-up control signal is relayed from the master fan unit FAN1-2 or FAN1-4 to one of the slave fan units FANx-2 or FANx-4, then such one slave fan unit to the next, and so forth, thereby setting the master fan unit FAN1-2 and the slave fan units FANx-2 as well as the master fan unit FAN1-4 and the slave fan units FANx-4 in back-up-control mode (as indicated by reference numbers 72 and 74) for inter-group control in terms of tuning-control groups i. In the meantime, in the unnecessary tuning-control group 1 requiring no back-up control, the slave fan units FANx-1 are under continued tuning control (indicated by reference numeral 71) in accordance with the self-control of the master fan unit FAN1-1.

Subsequently, assuming that, during that back-up control (indicated by reference numbers 81–84), the error fan unit FAN1-3 is replaced with a new fan unit by a trouble-shooter, the cooling monitor 5 is notified of that replacement. The cooling monitor 5 then stops outputting the back-up control signal to discontinue the back-up control to release the back-up tuning mode), then shifting to the monitor mode (indicated by reference number 95). And the individual tuning-control master FAN1-$i$ shifts to the self-control mode (indicated by reference numbers 91–94).

Meanwhile, as disclosed in, for example, Japanese Patent Laid-Open Publication No. 2000-346512, every tuning-control group containing at least one fan unit whose center is disposed within a circular zone ranging a predetermined distance from the center of the error fan unit may be regarded as a necessary back-up group. It is therefore possible to carry out the back-up control in the error happened condition without increasing the control-load of the cooling monitor 5, irrespective of the way of arrangement of the fan units, whichever two-dimensional or three-dimensional.

The structure of the multifan cooling system realizing the foregoing functions will now be described in detail.

Figure 5:
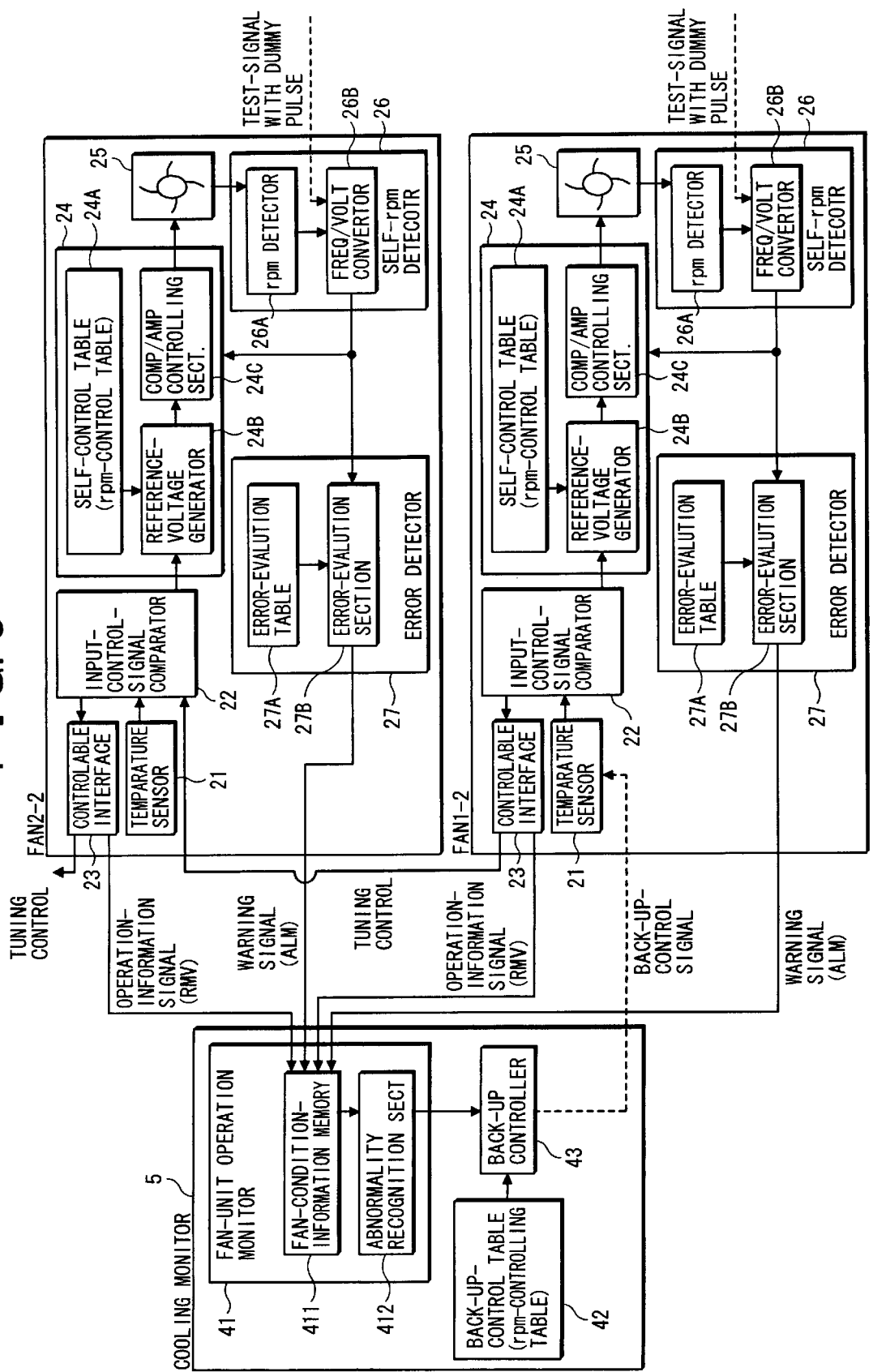
FIG. 5 is a block diagram showing a functional architecture of the multifan-equipped apparatus according to the one embodiment.

FIG. 5 is a block diagram of a functional architecture of the multifan cooling system according to the present embodiment, showing the relationship between the cooling monitor 5 and the fan units FAN1-2, FAN2-2. The relationship between the cooling monitor 5 and the other fan units is likewise though not shown in FIG. 5.

As shown in FIG. 5, the cooling monitor 5 includes a fan-unit operation monitor 41, which includes a fan-condition memory 411 and an abnormality recognition section 412, a back-up-control-table holder 42, and a back-up controller 43. Each of the fan units FAN1-2, FAN2-2 includes a temperature sensor 21, an input-control-signal comparator 22, a controllable interface (I/F) 23, a fan-drive controller 24, a fan 25, a self-rpm detector 26, and an error detector 27. The section composed of the fan-drive controller 24, the fan 25, the self-rpm detector 26, and the error detector 27 serves as a self-rpm controller that controls the rpm of the self fan 25 based on a below-described rpm-control-reference signal.

In the cooling monitor 5, the fan-condition holder 411, of the fan-unit operation monitor 41 holds (stores) fan-condition information about the operation condition of the individual fan unit FAN1-2, FAN2-2, which information is represented by the warning signal or other operation-information signal from the individual fan unit FAN1-2, FAN2-2. And the abnormality recognition section 412 periodically performs polling to find a fan unit that is abnormal in operation. If such abnormal fan condition has continued (or the warning signal has been continuously output) for a predetermined period, the abnormality recognition section 412 judges that an error has occurred with the fan unit FAN1-2 or FAN2-2 represented by the last-named warning signal. The abnormality recognition section 412 is embodied by, for example, a software filter so that the warning can be recognized without fail.

Generally, if the cooling performance of a fan unit is lowered due to decay, the warning signal output from the last-named fan unit tends to be unstable as friction varies with around-fan-unit temperature. Consequently the above-mentioned software filter is particularly effective in recognizing a warning signal when used in a sequence control to perform the back-up control after having received the warning signal. The contents stored in the fan-condition holder 411 is overwritten every time new fan-condition information is input.

The back-up-control-table memory 42 holds information necessary for the back-up control, such as rules for determination of necessary tuning-control group(s) i requiring the back-up control, in the form of a back-up-control-table (rpm-control table) 42. If occurrence of an abnormality is detected by the abnormality recognition section 412, the back-up controller 43 determines the tuning-control master fan unit FAN1-i of the necessary tuning-control group(s) to be backed up, based on the back-up-control table 42, and then outputs the back-up-control signal to the tuning-control master FAN1-i.

Meanwhile, in each of the fan units FAN1-1, FAN2-2, a temperature sensor 21 detects an temperature around the respective fan unit FAN1-1, FAN2-2, and an input-control-signal comparator 22 selectively outputs to the fan-drive controller 24 the temperature signal received from the temperature sensor 21 of the self fan unit or a control signal (the back-up-control signal, the tuning-control signal) received from an external element (the cooling monitor 5, a fan unit other than the self fan unit. The input-control-signal comparator 22 serves also to relay the received back-up-control signal or tuning-control signal to another fan unit of same tuning-control group 2 via the controllable I/F 23.

And the fan-drive controller 24 controls driving of the fan 25, including, for example, a self-control-table holder 24A (hereinafter also called the rpm-control-table holder), a reference-voltage generator 24B, and a comparator/amplifier controlling section 24C.

The self-control-table holder (rpm-control-table holder) 24A holds a self-control table (rpm-control table) Specifically, the self-control-table holder 24A keeps information that is essential to the linear-type self-control in accordance with the temperature detected at the temperature sensor 21 described in connection with FIG. 3 (first rpm information and second rpm information about a predetermined lower threshold rpm NL and a predetermined upper threshold rpm NH, and intermediate rpm information about rpm linearly varying between the lower threshold rpm NL and the upper threshold rpm NH).

Alternatively, the rpm information may be substituted by voltage information, which is generated by an analog electronic circuit, such as a voltage generator circuit or a linear amplifier, as described later in connection with FIGS. 8 through 10; it is possible to hold the rpm information can be held without using a storage device such as ROM or RAM.

The reference-voltage generator 24B generates a reference voltage (hereinafter also called the rpm-control-reference voltage), which drives the fan 25, based on the self-control table 24A and a signal input from the input-control-signal comparator 22. The comparator/amplifier controlling section 24C compares an output voltage value of the reference-voltage generator 24B and an output voltage value (corresponding to the rpm of the self fan) of the self-rpm detector 26, and then outputs such a voltage value so as to reduce the difference between the two output voltage values as a drive voltage to a minimum (substantially zero), as the drive voltage for the fan 25.

Accordingly, the comparator/amplifier controlling section 24C, the fan 25, and the self-rpm detector 26 forms a feed-back loop (servo system) for adjusting the rpm of the self fan to a target value.

Detail of Servo System

Figure 6:
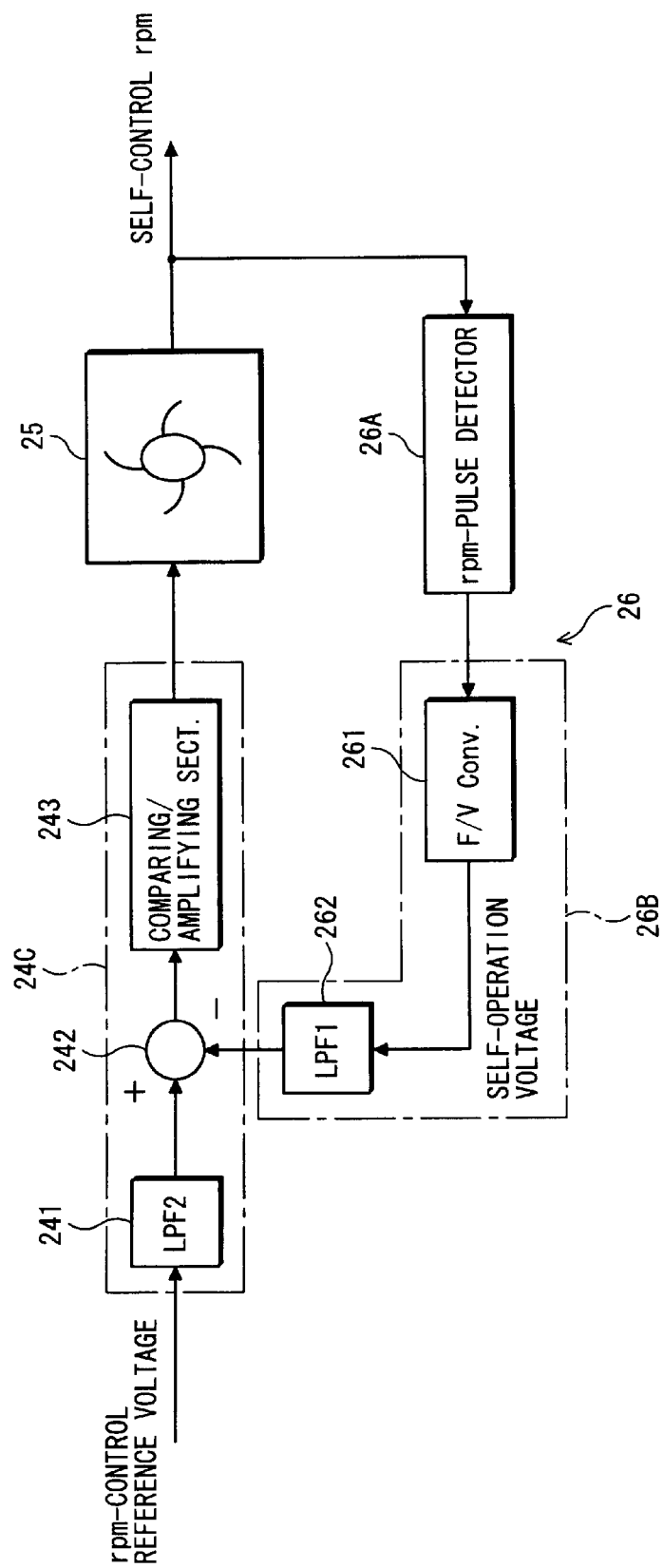
FIG. 6 is a block diagram showing a feedback loop (servo-control) for each of a plurality of fan units of FIG. 5.

The self-rpm detector 26 forming this servo system, as shown in FIGS. 5 and 6, defines the load of control as the rpm of the self fan, and detects a pulse wave (frequency signal), which is generated with rotation of the fan 25, by an rpm-pulse detector 26A and then converts the detected pulse wave into a voltage (self-operation voltage) by a frequency-to-voltage converter 26B (F/V converter 262). As a matter of course, the resultant self-operation voltage is proportional to the rpm of the fan 25.

Meanwhile, in the comparator/amplifier controlling section 24C, shown as FIG. 6, an adder 242 adds a difference in negative value between the rpm-control-reference voltage, which is transmitted from the reference-voltage generator 24B and corresponds to the to-be-stabilized rpm (target rpm) of the fan 25, and the above-mentioned self-operation voltage, whereupon a comparing/amplifying section 243 amplifies the resultant voltage and outputs the amplified voltage to the fan 25 to control.

If the difference between the rpm-control-reference voltage and the self-operation voltage is positive in value, then the fan-drive controller 24 transmits such a control voltage as to reduce the rpm. Otherwise if the difference is negative in value, then the fan-drive controller 24 transmits such a control voltage as to increase the rpm. As the result, the rpm of the fan 25 is autonomically adjusted to the target rpm, at which time the difference between the two voltages is reduced to zero.

To realize a stabilized control to cope with possible sharp variation of the rpm-control-reference voltage generated from the reference-voltage generator 24B, as shown FIG. 6, it suffices that the feed-back loop is partly formed by both a first filter circuit (hereinafter called the first low-pass filter or LPF1) 262, which has a time constant T1 and performs filtration with respect to the self-operation voltage to be output to the comparator/amplifier controlling section 24C and a second filter circuit 241 (hereinafter called the second low-pass filter or LPF2), which has a time constant T2 (T2>T1) and performs filtration with respect to the control-reference voltage to be output from the reference-voltage generator 24B to the comparator/amplifier controlling section 24C.

With this arrangement, since an output response of the second filter circuit 241, which is disposed on the control-reference voltage line, will be later than the output response of the first filter circuit 262, which forms part of the feedback loop, it is possible to avoid any possible undue oscillation phenomenon within the feed-back loop even when the rpm-control-reference voltage varies sharply, thus realizing a stabilized rpm-control.

Figure 7:
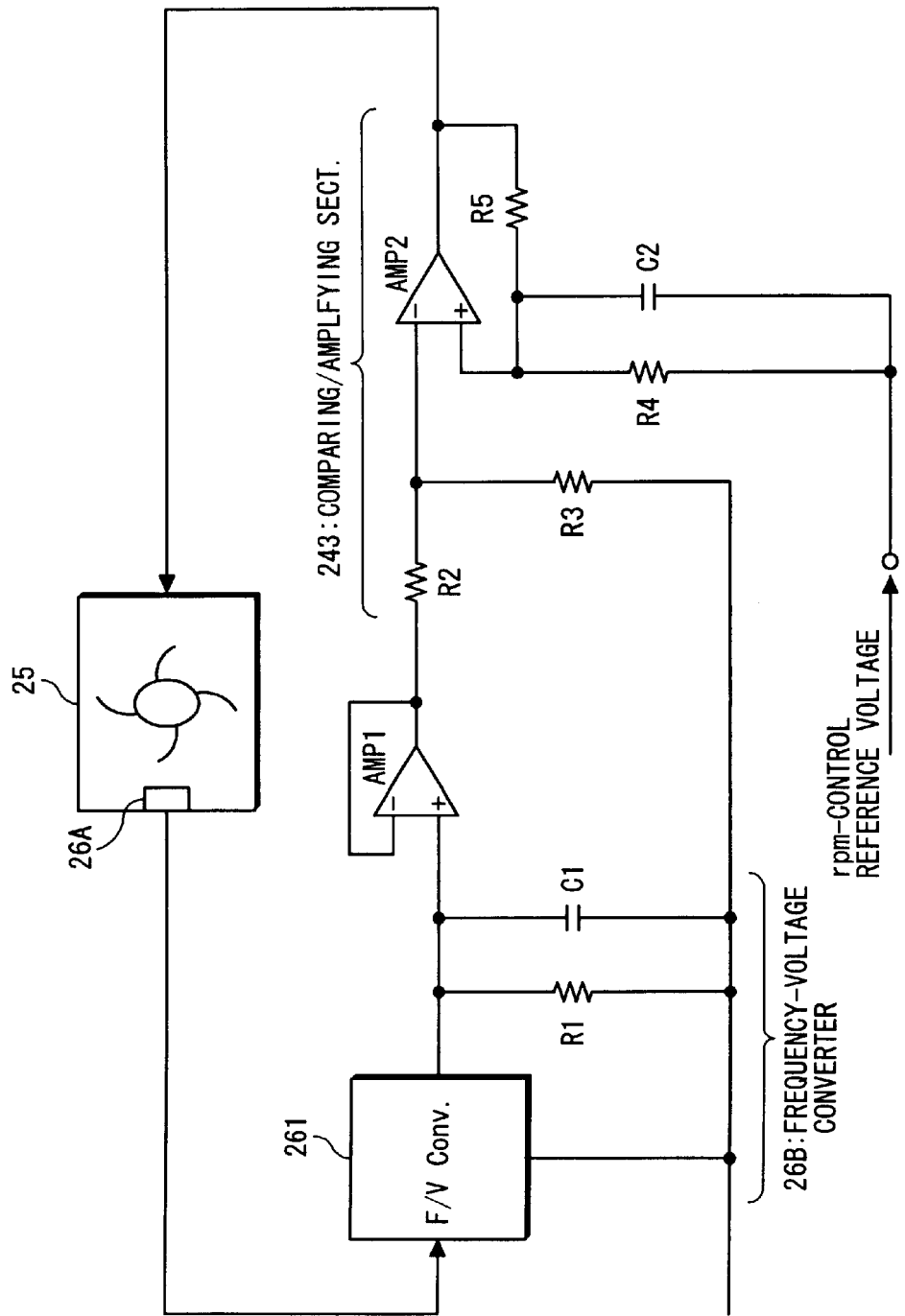
FIG. 7 is a circuit diagram showing a practical circuit example of the feedback loop (servo-control) of FIG. 6.

FIG. 7 is a circuit diagram showing a practical circuit example of the servo system. In FIG. 7, a resistor R1 and capacitor C1 jointly constitute the first filter circuit 262, and resistors R4, R5 and capacitor C2 jointly constitute the second filter circuit 241. An operational amplifier AMP2 and the resistors R2, R3, R4, R5 jointly serve as the comparing/amplifying section 243 of FIG. 6. The operational amplifier AMP2 calculates a difference between the rpm-control-reference voltage and the self-operation voltage received from the F/V converter 261, whereupon a differential amplifier circuit constituted by the resistors R2, R3, R4, R5 amplifies the calculated difference and then outputs the resultant difference in negative value to the self fan 25 as a control signal for the same fan 25. The operational amplifier AMP1 is a voltage follower, which transmits an input signal in one way to the comparing/amplifying section 243.

Using the above-mentioned servo system, as shown in FIG. 3, it is possible to stably control the fan 25 even according to a linear-type control and also to stably adjust the rpm of the fan 25 to the target value regardless of disturbance, such as fluctuation of supply voltage to the fan 25 is non-stable and variation of load torque on the fan 25 due to the viscous drag of bearing grease for a fan-rotor (not shown) with change in temperature around the fan-rotor.

Detail of rpm-Control-Reference Voltage Generating Method

The method of generating the rpm-control-reference voltage (operational algorithm) will now be described.

Figure 8:
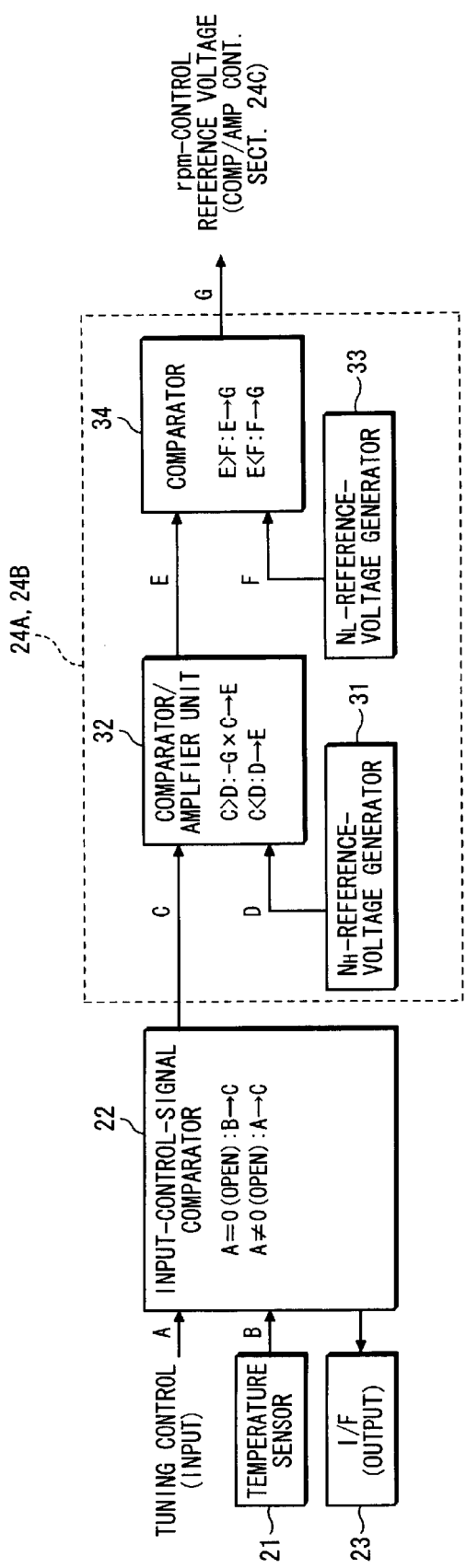
FIG. 8 is a block diagram illustrating an operational algorithm for an rpm-control reference voltage generated by an input-control-signal comparator and a reference-voltage generator.

As shown in FIG. 8, in the presence of an input control signal (A), the input-control-signal comparator 22 outputs a voltage value of the control signal (A), with precedence over a signal (B) from the temperature sensor 21, as a control voltage (C). Otherwise in the absence of the input control signal (A), the input-control-signal comparator 22 outputs a voltage value of the signal (B), which has been input from the temperature sensor 21, to the reference-voltage generator 24B as the control voltage (C). Further, the input-control-signal comparator 22 transmits the control voltage (C), as the tuning-control signal, to another fan unit of the same group i for subsequent relaying to and throughout the remaining fan units of the same group as if in a chain reaction.

Namely, in the master fan unit FAN1-i, the control signal (A) is the back-up-control signal from the cooling monitor 5 for setting the autonomic operation mode (rpm-control mode) to the back-up-control mode. Meanwhile in the individual slave fan unit FANx-i, the control signal (A) is the tuning-control signal from the master fan unit FAN1-i or the preceding slave fan unit, is the tuning-control signal.

Accordingly, the input-control-signal comparator 22 of the master fan unit 1-i serves as a first input-control-signal selector that outputs a signal corresponding to the around-fan-unit temperature detected by the temperature sensor 21, as the rpm-control-reference signal and the tuning control signal respectively to the fan-drive controller 24 and at least one of the slave fan units FAN(x+1)-i in the same tuning-control group i. Otherwise upon receipt of the back-up-control signal from the cooling monitor 5, the first input-control-signal selector outputs the received back-up-control signal as the rpm-control signal and the tuning-control signal respectively to the fan-drive controller 24 and at least one of the slave fan units FAN(x+1)-i.

Meanwhile, in the individual slave fan unit FANx-i, the input-control-signal comparator 22 serves as a second input-control-signal selector that outputs the rpm-control-reference signal, which corresponds to the around-fan-unit temperature detected by the temperature sensor 21, to the fan-drive controller 24 as rpm-control-reference signal. Otherwise upon receipt of the tuning-control signal from the master fan unit FAN1-i or one of the slave fan units FAN(x−1)-i in the same tuning-control group i, the second input-control-signal selector outputs the received tuning-control signal as the rpm-control-reference signal and the tuning-control signal respectively to the fan-drive controller 24 and one of the other slave fan unit FAN(x+1)-i.

Since the input-control-signal comparator 22 can output the signal, which has been received from the temperature sensor 21, or the tuning-control signal, which has been input from outside, as the rpm-control-reference signal and the tuning-control signal respectively to the self fan-drive controller 24 of the fan unit and at least one of the other slave fan units FANx-i, it is possible to isolate transmission of the tuning-control signal from the rpm control by the servo system of the succeeding fan unit and also from error detection process by the error detector 27. It is therefore possible to carry out transmission of the tuning-control signal normally, regardless of whether or not an error has occurred in any of the fan units FAN1-i, FAN2-i, FAN3-i including the master fan unit.

The reference-voltage generator 24B is composed of three functional parts, as shown in FIG. 8, which are an NH-reference-voltage generator 31, a comparator/amplifier unit 32, an NL-reference-voltage generator 33, and a comparator 34. The NH-reference-voltage generator 31 generates a first reference voltage (indicated by D in FIG. 8) for the high-speed control operation $N_H$ (hereinafter also called the $N_H$-reference voltage), which is described above in connection with FIG. 3. And the NL-reference-voltage generator 33 generates a second reference voltage (indicated by F in FIG. 8) for the low-speed control operation $N_L$ (hereinafter also called the $N_L$-reference voltage), which is described above in connection with FIG. 3.

The comparator/amplifier unit 32 compares the $N_H$-reference voltage D with the control voltage C (hereinafter also called the input control signal) input from the input-control-signal comparator 22. If the input control voltage C is higher than the $N_H$-reference voltage D (C>D), then the comparator/amplifier unit 32 amplifies the input control voltage C by multiplying with a predetermined ratio (−G×C) and outputs the resultant value to the comparator 34 as an output control voltage E. Otherwise if the input control voltage C is lower than the NH-reference voltage D (C<D), then the comparator/amplifier unit 32 outputs the received $N_H$-reference voltage D, without amplifying, to the comparator 34 as the output control voltage E.

Figure 9A:
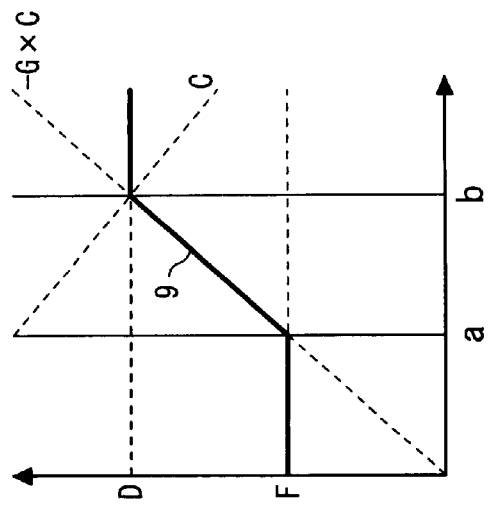
FIG. 9(A) is a graph showing an output voltage characteristic of the input-control-signal comparator of FIG. 8.

FIG. 9(A) shows a characteristic 8a of the output control voltage E of the comparator/amplifier unit 32. According to this voltage characteristic 8a, in the range satisfying C<D, the output control voltage C is constant, and in the range satisfying C>D, the control voltage C is amplified by the gain of the amplifier part of the comparator/amplifier unit 32.

The comparator 34 compares the control voltage E, which is input from the comparator/amplifier unit 32, with $N_L$-reference-voltage F. If the control voltage E is higher than $N_L$-reference-voltage F (E>F), then the comparator 34 outputs the control voltage E to the comparator/amplifier controlling section 24C (servo system), as an rpm-reference voltage G. Otherwise if control voltage E is lower than the NL-reference-voltage F (E<F), then the comparator 34 outputs the $N_L$-reference-voltage F to the comparator/amplifier controlling section 24C (servo system), as the rpm-reference voltage G.

Figure 9B:
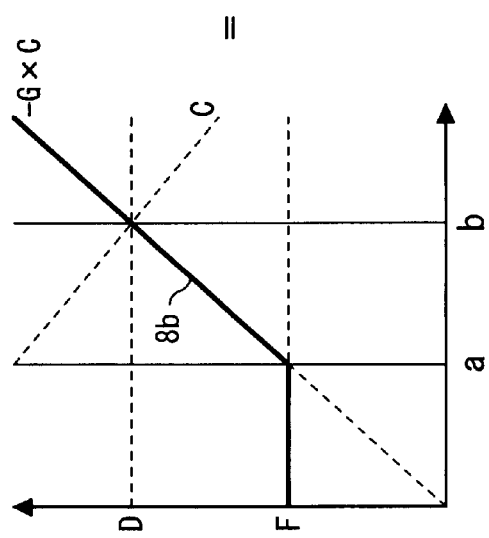
FIG. 9(B) is a graph showing an output voltage characteristic of a comparator of FIG. 8.
Figure 9C:
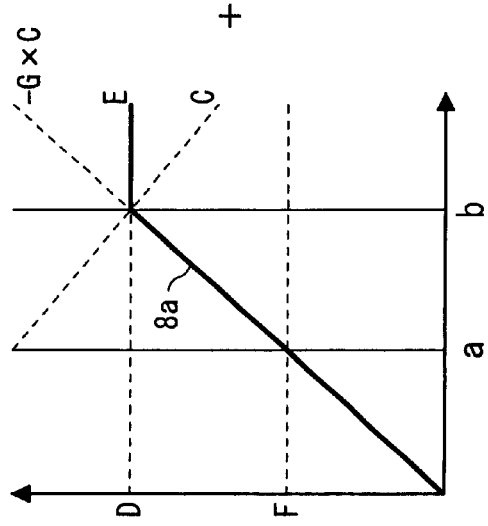
FIG. 9(C) is a graph showing a rpm-control reference-voltage characteristic derived the respective output voltage characteristics of FIGS. 9(A) and 9(B)

FIG. 9(B) shows an output voltage characteristic 8b of the comparator 34. According to this output voltage characteristic 8b, in the range satisfying (−G×C)<F as the control voltage (−G×C) is input from the preceding fan unit, the $N_L$-reference voltage F is output. FIG. 9(C) shows a voltage characteristic 9 of the rpm-control-reference voltage G, which is obtained as the output voltage of the comparator 34; this voltage characteristic 9 is a composite voltage characteristic of the foregoing characteristics 8a, 8b of FIGS. 9(A) and 9(B), which indicates that a reference voltage realizing the linear autonomic control of FIG. 3 can be generated.

Thus, the reference-voltage generator 24B takes an operation using a common operational algorithm, regardless of the contents (the tuning-control signal or the self-control signal from the self temperature detector 21) of the control voltage C input from the input-control-signal comparator 22.

Figure 10:
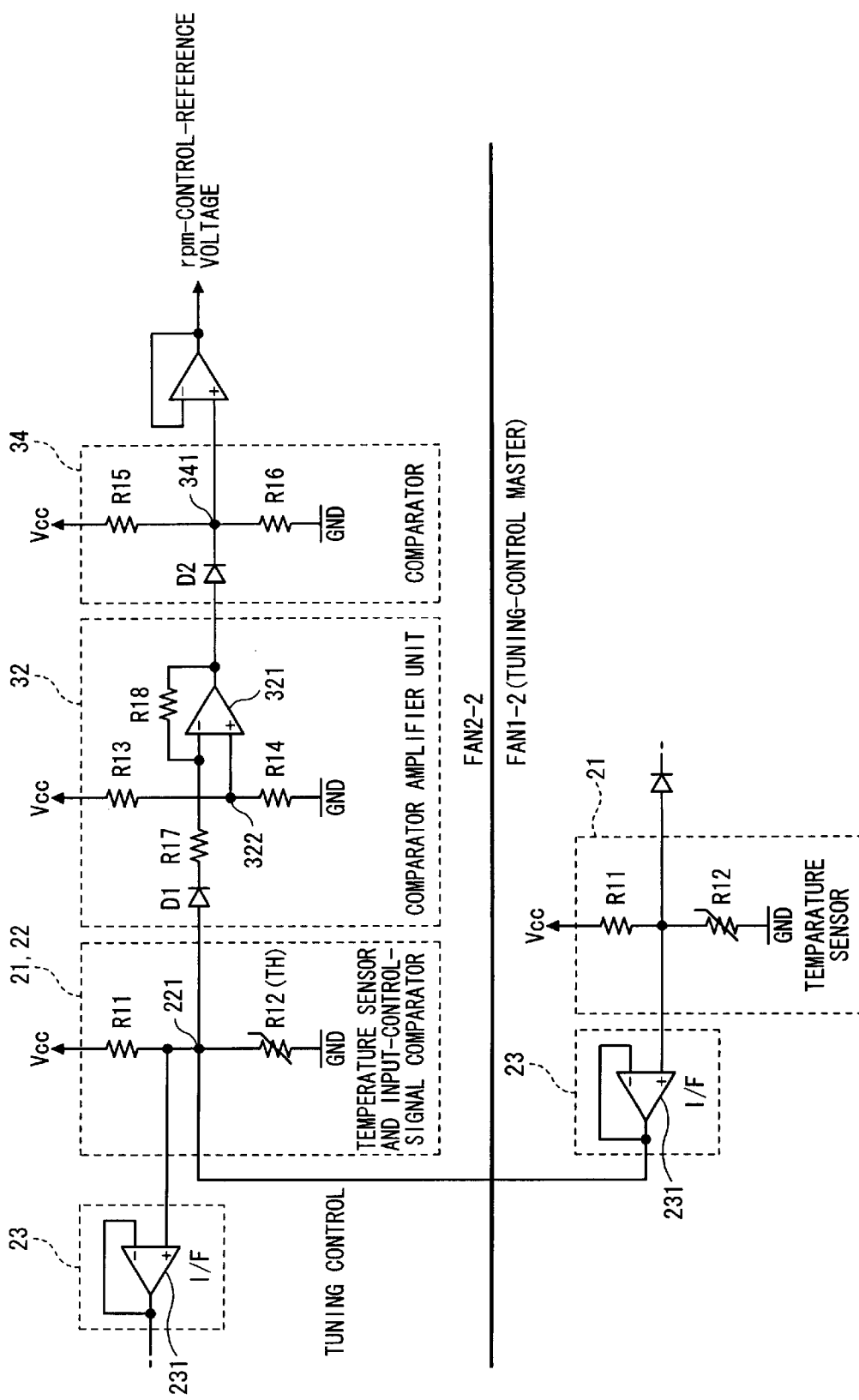
FIG. 10 is a circuit diagram showing a practical circuit example of the input-control-signal comparator and the reference-voltage generator of FIG. 8.

FIG. 10 shows practical circuit examples of the temperature sensor 21, the input-control-signal comparator 22, the controllable interface 23, the reference-voltage generator 24B, which realize the above-mentioned operational algorithm. In a lower part of FIG. 10, the circuit elements for the master fan unit FAN1-2 are depicted, being the temperature sensor 21, the input-control-signal comparator 22, and controllable interface 23. In the upper portion of FIG. 10, the circuit elements for the slave fan unit FAN2-2 are depicted, being the other temperature sensor 21, the other input-control-signal comparator 22, the other controllable interface 23, and the reference-voltage generator 24B.

As shown in FIG. 10, the temperature sensor 21, which also serves as the input-control-signal comparator 22, includes a resistor R11 and a register (in the form of a thermistor) R12. And the comparator/amplifier unit 32 includes a diode D1, a plurality of resistors R13, R14, R17, R18, and an operational amplifier 321. Further, the comparator 34 includes a diode D2 and a plurality of resistors R15, R16.

The output port of the controllable interface 23 in the master fan unit 1-i and is directly connected to a joint 221 the two resistors R11 and R12 of the input-control-signal comparator 22 in the slave fan unit 2-i of the same tuning-control group i so that the temperature-detection signal from the temperature sensor 21 can be normally input to the slave fan unit 2-i via the controllable interface 23.

Accordingly, since it normally receives the tuning-control signal from the master fan unit FAN1-i, the slave fan unit 2-i undergoes the tuning control by the master fan unit FAN1-i with precedence over the self-control by the temperature sensor 21 of itself. During that time, the slave fan unit 2-i relays the tuning-control signal, which has received from the master fan unit 1-i, to another slave fan unit 3-i via the interface unit 23.

Theoretically, since the individual slave fan units FANx-i are operating normally based on the tuning-control signal as described above, every fan unit FANx-i except the maser fan unit FAN1-i does not require any additional element dedicated the self-control function based on the temperature detection signal of the self temperature sensor. Practically, however, because the individual fan units FAN1-i, FAN2-i, FAN3-i, can have a common structure by taking the above-described arrangement, it is possible to use any of the fan units FAN1-i, FAN2-i, FAN3-i as either the master fan unit or the slave fan unit, thus reducing the cost of production.

The resistors R13, R14 serve also as the NH-reference-voltage generator 31. If the voltage at a joint 322 of these two resistors R13, R14 (NH-reference voltage) is higher than the output voltage of the input-control-signal comparator 22 (voltage at the joint 221 of the resistor R1 and the variable resistor R2), then the voltage at the joint of the resistors R13, R14 (NH-reference voltage) is output to the comparator 34 via the operational amplifier 321 by the current-blocking-action of the diode D1.

Otherwise if the NH-reference voltage at the joint 322 of the two resistors R13, R14 is lower than the output voltage of the input-control-signal comparator 22 (voltage at the joint 221), is higher than the NH-reference voltage inputted to the connection point 322, then a current flows into a reverse-amplifier circuit, which is constituted by the resistors R17, R18 as the input to the diode D1 becomes forward in direction. As the result, this reverse-amplifier circuit outputs the output voltage having been amplified linearly (reverse amplification by −G times) by the gain (G) of the operational amplifier 321, as the input to the succeeding comparator 34.

In the comparator 34, the two resistors R15, R16 jointly serve as the NL-reference-voltage generator 33 so that a voltage at the joint 341 of the resistors R15, R16, is the NL-reference voltage. If the output voltage of the comparator/amplifier unit 32 is lower than the NL-reference voltage at the joint 341, the voltage at the joint 341 is output as rpm-control-reference voltage with precedence over the output voltage of the comparator/amplifier unit 32 by the current-blocking action of the diode D2, like the diode D1. if the output voltage of the comparator/amplifier unit 32 is higher than the NL-reference voltage, then a current from the comparator/amplifier unit 32 flows forwardly via the diode D2 so that the output voltage of the comparator/amplifier unit 32 is input to the comparator 34 as the rpm-control-reference voltage.

The complex operational algorithm described above in connection with FIG. 8 is realized by a simple, less expensive analog electronic circuit using plural analog devices, such as the resistors, the operational amplifiers, and the diodes.

Detail of Error Detector

If the self-rpm detected by the self-rpm detector 26 becomes lower than a predetermined threshold, the error detector 27 of FIG. 5 notifies the cooling monitor 5 (fan-condition memory 411) of the occurrence of an error. For example, the error detector 27 includes the detected-errortable memory 27A for storing such information in the form of an error-evaluation table containing information related with the last-named threshold, and the error-evaluation section 27B for evaluating the occurrence of an error when the self-rpm is lower than the threshold stored in the error-evaluation table.

Figure 11:
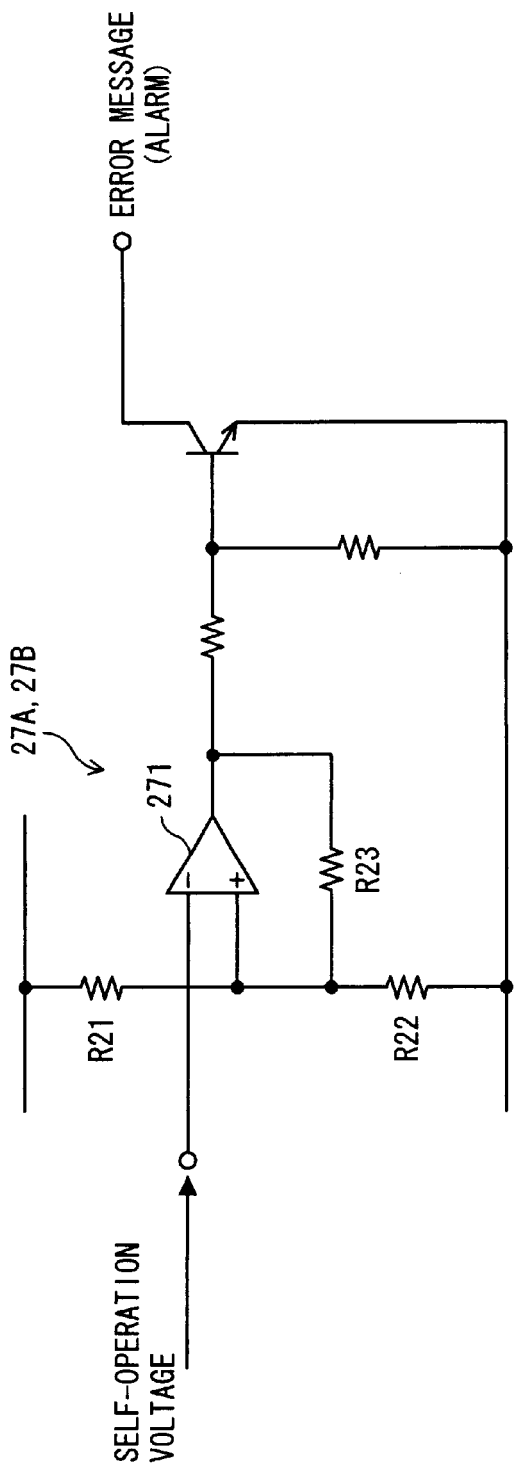
FIG. 11 is a circuit diagram showing a practical circuit example of an error detector shown in FIG. 5.

Now assuming that the threshold for the self-rpm is incorporated with hysteresis, it is possible to avoid any misdetection of an error due to fluttering of rpm. This error detection function is realized by, for example, a hysteresis-incorporated comparator shown in FIG. 11, which comparator includes an operational amplifier 271 and a plurality of resistors R21, R22, R23. Each of the resistors R21, R22 is connected at one end to the positive input-port of the operational amplifier 271, and the resistor (hereinafter also called the feedback resistor) R23 is connected between the output-port of the amplifier 271 and the positive input-port of the amplifier 271. The frequency-voltage converter 26B (F/V converter 261 constituting the servo system as shown in FIGS. 5 and 6) is connected to the negative input-port of the operational amplifier 271 to input the self-operation voltage, and an error-reference voltage (to be determined by the resistors R21, R22), which indicates the occurrence of an error, is input to the positive input-port of the operational amplifier 271. And the output voltage of the operational amplifier 271 is feedbacked to the positive input-port of itself via the feedback resistor R23 (positive feedback), According to the multifan cooling system of this embodiment, partly since the fan units are adjusted in rpm by the tuning control in terms of groups, in which the fan units FAN1-$i$, FAN2-$i$, FAN3-$i$ of the same group i are arranged one over another, the group extending across the upper, intermediate and lower local regions in the chassis (in-group control), and partly since the back-up control is concentrated on the master fan unit FAN1-$i$ in the back-up control mode upon occurrence of an error (inter-group control), it is possible to improve the cooling efficiency to a great extent with in-apparatus cooling air flows normally kept balanced, and to cope with even the three-dimensional fan-unit arrangement by the two-dimensional control, thus streamlining the control (reducing the load of control) of the control monitor 5. With a combination of in-group control (tuning control) and inter-group control (back-up control), this multifan cooling system realizes adequate cooling performance with less operating power even if a plurality of electronic devices to be cooled are mounted one over another.

Further, since the individual fan units FAN1-$i$, FAN2-$i$, FAN3-$i$ is operated under the linear self-control, it is possible to avoid possible flattering of temperature, called sharp-rise-and-fall temperature, which would occur according to the conventional and hence stepwise self-control, and to suppress possible bad influence on electronic devices to be cooled, thus causing damage-free cooling. Particularly in this embodiment adopting the servo system, it is possible to control the fan units in rpm effectively with stableness, realizing more effective operation of the individual fan unit.

Furthermore, according to this embodiment, because an analog circuit is used to accomplish the linear control, it is particularly useful in downsizing of the circuit and reducing the cost of production as compared to a digital circuit. Additionally, because the temperature-detection signal (the temperature information) detected by the master fan unit FAN1-$i$ is treated as a common signal for tuning control on the remaining (slave) fan units FANx-i in the same group i, it is possible to make the individual fan unit simple in structure.

How to Test Fan Units

Since any of the fan units FAN1-$i$, FAN2-$i$, FAN3-$i$ is in the form of an analog circuit that varies the rpm-control-reference voltage by the operational algorithm and servo system described above in connection with FIG. 8, it is particularly preferable to make a test on the product before shipping.

Namely, since the control signal is looped in the servo system, the rpm value to be locked tends to depend on the fluctuations of operation of the object to be controlled (fan 25). As a result, an rpm detector is required in making an operation test on the individual fans 25 as mounted, which is laborious and time consuming and hence impairs the productivity. Consequently, amore effective test is carried out using a printed-base or -board (PT-base) 12 shown in FIG. 12.

Figure 12:
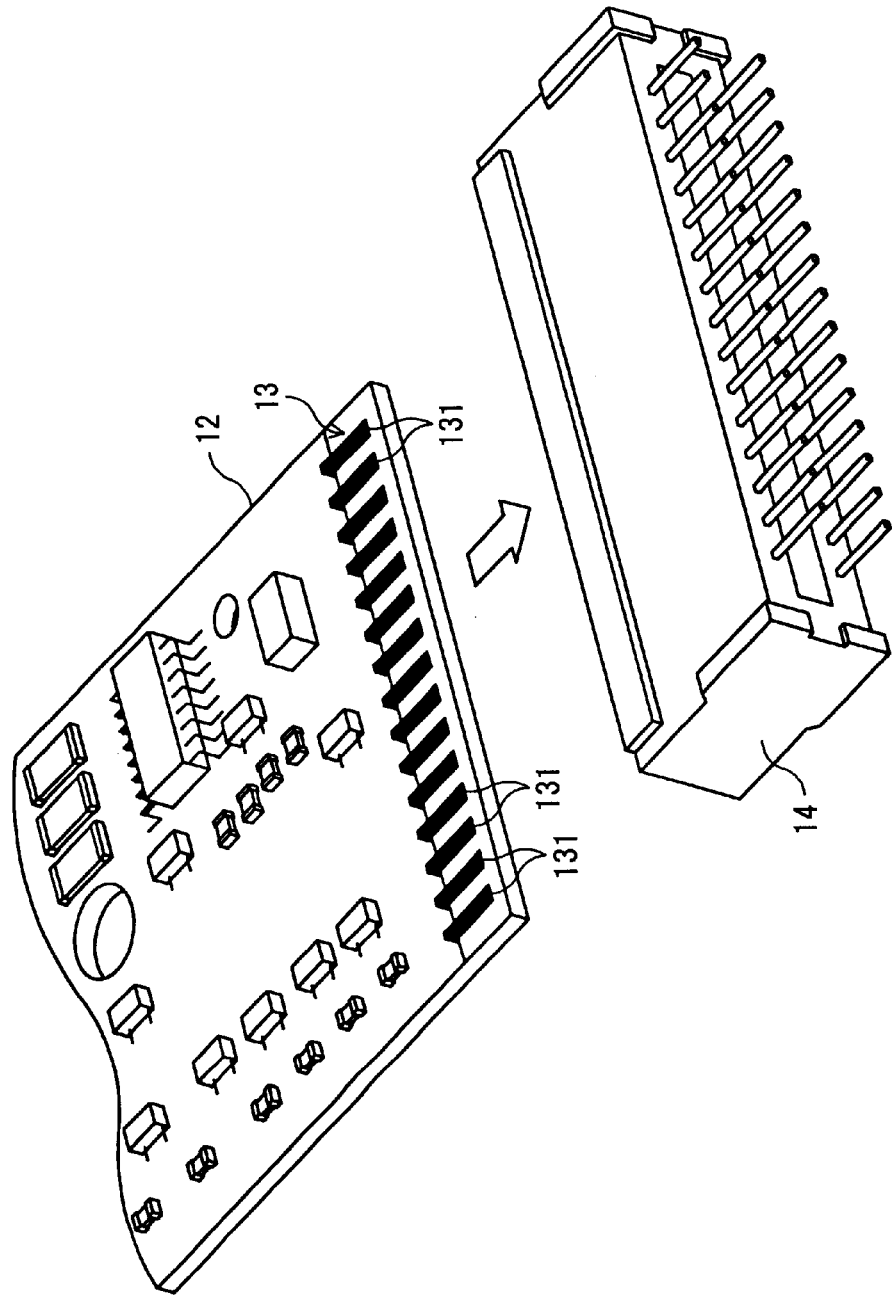
FIG. 12 is a schematic perspective view showing a base with a card-edge-connector and a connector mounted on an external tester, illustrating how to test the operation of the individual fan unit of the one embodiment.

On the PT-base 12 of FIG. 12, a card-edge connector (card-edge interface) 13 is mounted together with the individual fan units FAN1-$i$, FAN2-$i$, FAN3-$i$.

The card-edge connector 13 has a plurality of pins 131 to be fitted into a mating connecter 14 of a non-illustrated external tester so that the individual fan units can receives a testing signal from the external tester via the card-edge connector 13.

This connector arrangement enables having access from the external tester to the individual fan units FAN1-$i$, FAN2-$i$, FAN3-$i$ without increasing the number of the pins of the connector for testing and without mounting any test-dedicated elements on the PT-base, which is very advantageous to reduce the cost of production. This connector arrangement further improves the testing efficiency because inserting the card-edge connector 13 of the PT-base 12 into the mating connector 14 suffices to make a test.

In the actual test, an operation test for the servo system also is possible as the output (rpm-control-reference voltage) level of the self-rpm detector 26 is monitored by inputting a pseudo-pulse (pseud rpm signal), which is a dummy rpm pulse instead of an actual rpm signal from the fan 25, from the external tester via the pins 131 of the card-edge connector 13 to the frequency-voltage converter 26B of the self-rpm detector 26 (FIG. 5) as the above-mentioned testing signal. Assuming that two kinds of pseudo-error pulses (one over a warning detection threshold and other under the warning detection threshold) are input at the same time, an operation test for the error detector 27 also is possible.

To cope with a variety of kinds of elements to be tested in view of effective use of automated testing equipment, it is preferable to assign identifications (IDs), which are unique to the respective elements or items to be tested, one to each of plural different card-edge connectors (13). This can be realized by setting the pins 131 of each card-edge connector (13) in a different open-ground arrangement from that of another card-edge connector (13). Now assuming that a particular card-edge connector (13) of the PT-base 12 is simply inserted into the mating connector 14 of the external tester, it is possible to recognize, from the external tester, which item is to be tested, thus improving the efficiency of automated testing.

Modifications

In foregoing embodiment, the fan-unit assembly is divided into groups in such a manner that each group i is composed of a plurality of fan units disposed one over another in the upper, intermediate and lower layers within the chassis; this is, each group extends vertically across the different layers. Alternatively, the fan-unit assembly maybe divided into groups in a different way in view of balance of cooling performance within the whole apparatus. For example, each group may be composed of the fan units disposed side by side in a common layer, extending horizontally along such common layer. In each group of such alternative arrangement, a suitable fan unit may be selected as a master fan unit.

Further, the analog circuits, such as the servo system (feedback control loop), which serves to stabilize the individual fan unit in rpm, the fan-drive controller 24 and the error detector 27 should by no means be limited to the illustrated example of the foregoing embodiment. Alternative circuits may be applicable, provided that it realizes similar functions. Still further, the servo system may be omitted if an adequate degree of stability of rpm can be achieved in the absence of the servo system.

Moreover, in the foregoing embodiment, one of the fan units in the same tuning-control group i is selected as a master fan unit FAN1-$i$ that is autonomically controlled and make the tuning control on the remaining (slave) fan units FAN2-$i$, FAN3-$i$. Alternatively, all the fan units FAN1-$i$, FAN2-$i$, FAN3-$i$ of the same group i may be controlled in rpm by the cooling monitor 5 based on the same control information. This alternative arrangement enables the self-control and the tuning control, as well as the back-up control as if those performed by the master fan unit FAN1-$i$.

The present invention is not limited to the illustrated embodiment, and various changes or modifications may be suggested without departing from the gist and scope of the invention.

What is claimed is:

1. A multifan-equipped apparatus in which a plurality of objects mounted at different local interior regions are controllably cooled by blowing air, comprising:

a fan-unit assembly, composed of a plurality of fan units that are divided into a plurality of groups disposed at respective local interior regions, for blowing air over the objects to cool, the plural fan units in the same group being arranged in a queue along the corresponding local interior region;

one of said plural fan units of each group being a master fan unit that is autonomically adjustable in revolutions per minute (rpm) in accordance with a current apparatus-environment temperature at the corresponding local interior region and serves to make a tuning control on the rpm of at least one of the remaining fan units in the same group so as to adjust the rpm of said at least one of the remaining fan units in the same group to a first estimated value corresponding to the rpm of said master fan unit; and means for monitoring an operational state of every fan unit of each group and, if an error occurs in the operational state of a fan unit of a group, means of setting the current rpm of said master fan unit of at least one other group to a second estimated value for a back-up control minimizing a possible loss of cooling performance of said fan-unit assembly due to the occurrence of the error.

2. A multifan-equipped apparatus according to claim 1, wherein said monitoring means includes an error detector for periodically or non-interruptedly monitoring every fan unit by polling as to whether or not an error has occurred in the operational state and judging a fan unit as having encountered such error.

3. A multifan-equipped apparatus according to claim 2, wherein said master fan unit of each group includes:

a temperature sensor for detecting said temperature;

a first control-signal selector selecting for output either of a signal responsive to said temperature sensor or a signal responsive to said monitoring means, said output being a predetermined rpm-control reference signal; and an autonomic controller for autonomically controlling the rpm of said master fan unit based on said predetermined rpm-control reference signal, wherein said predetermined rpm-control reference signal also servers as a tuning control signal to control the rpm of said at least one of the remaining fan units.

4. A multifan-equipped apparatus according to 3, wherein said autonomic controller includes:

an autonomic-control-table holder for holding an autonomic-control table that is defined by first rpm information and second rpm information, which is preset with respect to the temperature, and third rpm information linearly ranging between said first rpm information and said second rpm information; and an rpm-control-signal generator for generating an rpm-control signal that controls the rpm of said master fan unit, based on both said rpm-control reference signal and said autonomic-control table.

5. A multifan-equipped apparatus according to claim 4, wherein said autonomic controller further includes:

an rpm detector for detecting a current rpm of said master fan unit; and a comparator and controller unit for comparing the output of said rpm-control-signal generator with the output of said rpm detector in voltage, and performing a feedback control on the detected rpm of said master fan unit so as to minimize a voltage difference of such two outputs.

6. A multifan-equipped apparatus according to claim 5, wherein said autonomic controller further includes:

a first filter circuit for filtering the output voltage of said rpm detector as one of the two voltages to be compared by said comparator and controller unit; and a second filter circuit for filtering the output voltage of said rpm-control-signal generator as the other of the two voltages to be compared by said comparator and controller unit;

a time constant preset for said second filter circuit being larger than that preset for said first filter circuit.

7. A multifan-equipped apparatus according to claim 4, wherein said control-table holder and said rpm-control-signal generator include:

a first reference-voltage generator for generating a first reference voltage as a function of said first rpm information;

a comparator and amplifier unit for comparing a voltage value of said rpm-control reference signal with said first reference voltage and outputting said voltage value of said rpm-control reference voltage if said first reference voltage is larger than said voltage value, and for linearly amplifying said first reference voltage by a predetermined constant and outputting the resulting reference voltage if said voltage value of said rpm-control reference signal is larger than said first reference voltage;

a second reference-voltage generator for generating a second reference voltage commensurate with said second rpm information; and a comparator and controller for comparing the output voltage value of said comparator and amplifier unit with said second reference voltage and, if said output voltage value of said comparator and amplifier unit is larger than said second reference voltage, outputting said second reference voltage as said rpm-control signal and, if said second reference voltage is larger than said output voltage value of said comparator and amplifier unit, outputting said output voltage value of said comparator and amplifier unit as said voltage value of said rpm-control signal.

8. A multifan-equipped apparatus according to claim 5, wherein:

said rpm detector includes a voltage converter for convening said rpm of said master fan unit, which is detected by said rpm detector, into a voltage value; and said autonomic controller includes an error detector for comparing a threshold voltage value corresponding to an rpm value indicative of occurrence of an error, and detecting occurrence of an error due to a possible lowered rpm, as the result of the comparison, which error occurrence is to be notified to said master fan unit by a warning signal.

9. A multifan-equipped apparatus according to claim 8, further comprising a substrate on which said fan units are mounted, said substrate having a card-edge interface that is electrically connectable to an external tester, which performs an operation test on individual fan units, so that every fan unit can receive a testing signal from the external tester via said card-edge interface when said card-edge interface is fitted in a mating connector of the external tester.

10. A multifan-equipped apparatus according to claim 9, wherein said rpm detector of each said fan unit receives a test rpm signal, which is to be used as said testing signal in resting the operation of said error detector, via said card-edge interface.

11. A multifan-equipped apparatus according to claim 9, wherein one or more identifications respectively unique to one or more items to be tested is assigned to said card-edge interface.

12. A multifan-equipped apparatus according to claim 10, wherein one or more identifications respectively unique to one or more items to be tested is assigned to said card-edge interface.

13. A multifan-equipped apparatus according to claim 2, wherein every fan unit except said master fan unit in each group includes:

a temperature sensor for detecting said temperature;

a first control-signal selector selecting for output either of a signal responsive to said temperature sensor or a second control signal, said output being a predetermined rpm-control reference signal; and;

an autonomic controller for autonomically controlling the rpm of a respective fan unit based on the predetermined rpm-control reference signal, wherein said second control signal is a control signal received from one of said master fan unit and said monitoring means, and wherein said predetermined rpm-control reference signal also servers as a tuning control signal to control the rpm of said at least one other of the remaining fan units.

14. A multifan-equipped apparatus according to 13, wherein said autonomic controller includes:

an autonomic-control-table holder for holding an autonomic-control table that is defined by first rpm information and second rpm information, which are preset with respect to the temperature, and third rpm information linearly ranging between said first rpm information and said second rpm information; and an rpm-control-signal generator for generating an rpm-control signal that controls the rpm of said respective fan unit based on both said rpm-control reference signal and said autonomic-control table.

15. A multifan-equipped apparatus according to claim 14, wherein said autonomic controller further includes:

an rpm detector for detecting a current rpm of said fan unit; and a comparator and controller unit for comparing the output of said rpm-control-signal generator with the output of said rpm detector in voltage, and performing a feedback control on the detected rpm of said fan unit so as to minimize a voltage difference of such two outputs.

16. A multifan-equipped apparatus according to claim 15, wherein said autonomic controller further includes:

a first filter circuit for filtering the output voltage of said rpm detector as one of the two voltages to be compared by said comparator and controller unit; and a second filter circuit for filtering the output voltage of said rpm-control-signal generator as the other of the two voltages to be compared by said comparator and controller unit;

a time constant preset for said second filter circuit being larger than that present for said first filter circuit.

17. A multifan-equipped apparatus according to claim 14, wherein said rpm-control-signal generator includes:

a first reference-voltage generator for generating a first reference voltage as a function of said first rpm information;

a comparator and amplifier unit for comparing a voltage value of said rpm-control reference signal with said first reference voltage and outputting said voltage value of said rpm-control reference voltage if said first reference voltage is larger than said voltage value, and for linearly amplifying said first reference voltage by a predetermined constant and outputting the resulting reference voltage if said voltage value is larger than said first reference voltage;

a second reference-voltage generator for generating a second reference voltage commensurate with said second rpm information; and a comparator and controller unit for comparing the output voltage value of said comparator and amplifier unit with said second reference voltage and, if said output voltage value of said comparator and amplifier unit is larger than said second reference voltage, outputting said second reference voltage as said rpm-control signal and, if said second reference voltage is larger than said output voltage value comparator and amplifier unit, outputting said output voltage value of said comparator and amplifier unit as said voltage value of said rpm-control signal.

18. A multifan-equipped apparatus according to claim 15, wherein:

said rpm detector includes a voltage converter for convening rpm of said fan unit, which is detected by said rpm detector, into a voltage value; and said autonomic controller includes an error detector for comparing a threshold voltage value corresponding to an rpm value indicative of occurrence of an error, and detecting occurrence of an error due to a possible lowered rpm, as the result of the comparison, which is to be notified to said master fan unit by a warning signal.

19. A multifan-equipped apparatus according to claim 18, further comprising a substrate on which said fan units are mounted, said substrate having a card-edge interface that is electrically connectable to an external tester, which performs an operation test on the individual fan units, so that every fan unit can receive a testing signal from said tester via said card-edge interface when said card-edge interface is fitted in a mating connector of the external tester.

20. A multifan-equipped apparatus according to claim 19, Wherein said rpm detector of each said fan unit receives a test rpm signal, which is to be used as said testing signal in resting the operation of said error detector, via said card-edge interface.

21. A multifan-equipped apparatus according to claim 19, wherein one or more identifications respectively unique to one or more items to be tested is assigned to said card-edge interface.

22. A multifan-equipped apparatus according to claim 20, wherein one or mote identifications respectively unique to one or more items to be tested is assigned to said card-edge interface.

23. A multifan-equipped apparatus according to claim 1, wherein said master fan unit of each group includes:

a first temperature sensor for detecting said temperature;

an autonomic cent-roller for autonomically controlling the rpm of said master fan unit based on a predetermined rpm-control reference signal; and a first control-signal selector receiving as inputs a first control signal, which is responsive to said temperature sensor, and a second control signal, which is responsive to said monitoring means, and selectively outputting one of the first control signal and the second control signal, wherein said first control-signal selector output is both the predetermined rpm-control reference signal and a tuning control signal to control the rpm of said at least one of the remaining fan units.

24. A multifan-equipped apparatus according to 23, wherein said autonomic controller includes;

an autonomic-control-table holder for holding an autonomic-control table that is defined by first rpm information and second rpm information, which are preset with respect to the temperature, and third rpm information linearly ranging between said first rpm information and said second rpm information; and an rpm-control-signal generator for generating an rpm-control signal that controls the rpm of a master fan unit based on both said predetermined rpm-control reference signal and said autonomic-control table held by said autonomic-control-table holder.

25. A multifan-equipped apparatus according to claim 24, wherein said autonomic controller further includes:

an rpm detector for detecting a current rpm of said master fan unit; and a comparator and controller unit for comparing the output of said rpm-control-signal generator with the output of said rpm detector in voltage, and performing a feedback control on the detected rpm of said master fan unit so as to minimize a voltage difference of such two outputs as the result of comparison by said comparator and controller unit.

26. A multifan-equipped apparatus according to claim 25, wherein said autonomic controller further includes:

a first filter circuit for filtering the output voltage of said rpm detector as one of the two voltages to be compared by said comparator and controller unit; and a second filter circuit for filtering the output voltage of said rpm-control-signal generator as the other of the two voltages to be compared by said comparator and controller unit;

a time constant preset for said second filter circuit being larger than that preset for said first filter circuit.

27. A multifan-equipped apparatus according to claim 24, wherein said rpm-control-signal generator includes:

a first reference-voltage generator for generating a first reference voltage as a function of said first rpm information;

a comparator and amplifier unit for comparing a voltage value of said rpm-control reference signal with said first reference voltage and outputting said voltage value if said first reference voltage is larger than said voltage value, and for linearly amplifying said first reference voltage by a predetermined constant and outputting the resulting reference voltage if said voltage value is larger than said first reference voltage;

a second reference-voltage generator for generating a second reference voltage commensurate with said second rpm information; and a comparator for comparing the output voltage value of said comparator and amplifier unit with said second reference voltage and, if said output voltage value of said comparator and amplifier unit is larger than said second reference voltage, outputting said second reference voltage as said rpm-control signal and, if said second reference voltage is larger than said output voltage value of said comparator and amplifier unit, outputting said output voltage value of said comparator and amplifier unit as said voltage value of said rpm-control signal.

28. A multifan-equipped apparatus according to claim 25, wherein:

said rpm detector includes a voltage converter for convening said rpm of said master fan unit, which is detected by said rpm detector, into a voltage value; and said autonomic controller includes an error detector for comparing a threshold voltage value corresponding to an rpm value indicative of occurrence of an error, and detecting occurrence of an error due to a possible lowered rpm, as the result of the comparison, which is to be notified to said master fan unit by a warning signal.

29. A multifan-equipped apparatus according to claim 28, further comprising a substrate on which said fan units are mounted, said substrate having a card-edge interface that is electrically connectable to an external tester, which performs an operation test on the individual fan units, so that every fan unit can receive a testing signal from the external tester via said card-edge interface when said card-edge interface is fitted in a mating connector of the external tester.

30. A multifan-equipped apparatus according to claim 29, wherein said rpm detector of each said fan unit receives a test rpm signal, which is to be used as said testing signal in testing the operation of said error detector, via said card-edge interface.

31. A multifan-equipped apparatus according to claim 29, wherein one or more identifications respectively unique to one or more items to be rested is assigned to said card-edge interface.

32. A multifan-equipped apparatus according to claim 30, wherein one or more identifications respectively unique to one or more items to be tested is assigned to said card-edge interface.

33. A multifan-equipped apparatus according to claim 1, wherein every fan unit except said master fan unit in each group includes:
a temperature sensor for detecting said temperature;
an autonomic controller for autonomically controlling the rpm of a respective fan unit based on a predetermined rpm-control reference signal; and
a second control-signal selector for selectively outputting a first control signal responsive to the temperature detected by said temperature sensor as said rpm-control reference signal to said autonomic controller and also as a tuning-control signal to at least one other fan unit for the tuning control, and a second control signal, which is received from said master fan unit or said monitoring means for the back-up control as said rpm-control reference signal to said autonomic controller and also as a tuning-control signal to said at least one other fan unit.

34. A multifan-equipped apparatus according to 33, wherein said autonomic controller includes:
an autonomic-control-table holder for holding an autonomic-control table that is defined by first rpm information and second rpm information, which are preset with respect to the temperature, and third rpm information linearly ranging between said first rpm information and said second rpm information; and
an rpm-control-signal generator for generating an rpm-control signal that controls a fan of said respective fan unit in rpm based on both said rpm-control reference signal from said second control-signal selector and said autonomic-control table held by said autonomic-control-table holder.

35. A multifan-equipped apparatus according to claim 34, wherein said autonomic controller further includes:
an rpm detector for detecting a current rpm of said fan, and
a comparator and controller unit for comparing the output of said rpm-control-signal generator with the output of said rpm detector in voltage, and performing a feedback control on the detected rpm of said fan so as to minimize a voltage difference of such two outputs as the result of comparison by said comparator and controller unit.

36. A multifan-equipped apparatus according to claim 35, wherein said autonomic controller further includes:
a first filter circuit for filtering the output voltage of said rpm detector as one of the two voltages to be compared by said comparator and controller unit; and
a second filter circuit for filtering the output voltage of said rpm-control-signal generator as the other of the two voltages to be compared by said comparator and controller unit;
a time constant preset for said second filter circuit being larger than that preset for said first filter circuit.

37. A multifan-equipped apparatus according to claim 34, wherein said rpm-control-signal generator includes:
a first reference-voltage generator for generating a first reference voltage as a function of said first rpm information;
a comparator and amplifier unit for comparing a voltage value of said rpm-control reference signal with said first reference voltage generated by said first reference-voltage generator and outputting said voltage value of said rpm-control reference voltage if said reference voltage is larger than said voltage value, and for linearly amplifying said first reference voltage by a predetermined constant and outputting the resulting reference voltage if said voltage value of said rpm-control reference signal is larger than said voltage value;
a second reference-voltage generator for generating a second reference voltage commensurate with said second rpm information; and
a comparator and controller unit for comparing the output voltage value of said comparator and amplifier unit with said second reference voltage from said second reference-voltage generator and, if said output voltage value of said comparator and amplifier unit is larger than said second reference voltage, outputting said second reference voltage as said rpm-control signal and, if said second reference voltage is larger than said output voltage value of said comparator and amplifier unit, outputting said output voltage value of said comparator and amplifier unit as said voltage value of said rpm-control signal.

38. A multifan-equipped apparatus according to claim 35, wherein:
said rpm detector includes a voltage converter for converting the rpm of said fan which is detected by said rpm detector, into a voltage value; and
said autonomic controller includes an error detector for comparing a threshold voltage value corresponding to an rpm value indicative of occurrence of an error, and detecting occurrence of an error due to a possible lowered rpm, as the result of the comparison, which is to be notified to said master fan unit by a warning signal.

39. A multifan-equipped apparatus according to claim 38, further comprising a substrate on which said fan units are mounted,
said substrate having a card-edge interface that is electrically connectable to an external tester, which performs an operation test on the individual fan units, so that every fan unit can receive a resting signal from said tester via said card-edge interface when said card-edge interface is fitted in a mating connector of the external tester.

40. A multifan-equipped apparatus according to claim 39, wherein said rpm detector of each said fan unit receives a test rpm signal, which is to be used as said testing signal in testing the operation of said error detector, via said card-edge interface.

41. A multifan-equipped apparatus according to claim 39, wherein one or more identifications respectively unique to one or more items to be tested is assigned to said card-edge interface.

42. A multifan-equipped apparatus according to claim 40, wherein one or more identifications respectively unique to one or more items to be tested is assigned to said card-edge interface.

43. A multifan-equipped apparatus according to claim 1, further comprising a substrate on which said fan units are mounted,
said substrate having a card-edge interface that is electrically connectable to an external tester, which performs an operation test on the individual fan units, so that every fan unit can receive a resting signal from the external tester via said card-edge interface when said card-edge interface is fitted in a mating connector of the external tester.

44. A multifan-equipped apparatus according to claim 43, wherein one or more identifications respectively unique to one or more items to be tested is assigned to said card-edge interface.

45. A multifan-equipped apparatus in which a plurality of objects mounted at different local interior regions are controllably cooled by blowing air, comprising:

a fan-unit assembly, composed of a plurality of fan units that are divided into a plurality of groups disposed across the different local interior regions, for blowing air over the object elements to cool, the plural fan units in the same group being arranged in a queue along a common air flow;

one of the plural fan units of each group being a master fan unit that is autonomically adjustable in revolutions per minute (rpm) in accordance with an apparatus-environment temperature in the corresponding local interior region and serves to make a tuning control on the rpm of at least one of the remaining fan units in each said group so as to adjust the rpm of said at least one of the remaining fan units in each said group to a first estimated value corresponding to the rpm of said master fan unit; and means for monitoring the operational state of every fan unit of each group and, if an error occurs in the operational state of a fan unit of a group, setting the current rpm of said master fan unit of at least one necessary group to a second estimated value for a back-up control minimizing a possible loss of cooling performance of said fan-unit assembly due to the occurrence of the error.

46. A multifan-equipped apparatus in which a plurality of objects mounted at different local interior regions are controllably cooled by blowing air, comprising:

a fan-unit assembly, composed of a plurality of fan units that are divided into a plurality of groups disposed along the respective local interior regions or across the different local interior regions, for blowing air over the objects to cool, the plural fan units in the same group being arranged in a queue and common in direction of blowing air; and means for monitoring the operational state of every fan unit of each group and, if an error occurs in the operational state of a fan unit of a group, varying revolutions per minute (rpm) of the fan units of as least one other group in accordance with a current apparatus-environment temperature in the corresponding local interior region using common control information, which is transmitted between the fan units of the other group, to an estimated value for necessary coordinated control minimizing a possible loss of cooling performance of said fan-unit assembly due to the occurrence of the error, thereby controlling the rpm of the fan units of said fan-unit assembly in terms of groups using the common control information for the same group.

\* \* \* \* \*